(12) United States Patent
Costanza

(10) Patent No.: US 6,198,980 B1
(45) Date of Patent: Mar. 6, 2001

(54) SYSTEM AND METHOD FOR DESIGNING A MIXED-MODEL MANUFACTURING PROCESS

(75) Inventor: John R. Costanza, Parker, CO (US)

(73) Assignee: John Costanza Institute of Technology, Englewood, CO (US)

( * ) Notice: Subject to any disclaimer, the term of this patent is extended or adjusted under 35 U.S.C. 154(b) by 0 days.

(21) Appl. No.: 09/186,919

(22) Filed: Nov. 6, 1998

(51) Int. Cl.$^7$ .................................................. G06F 19/00
(52) U.S. Cl. .................................... 700/99; 700/97; 705/8
(58) Field of Search ........................ 700/95–97, 99–108, 700/111; 705/8; 703/1

(56) References Cited

U.S. PATENT DOCUMENTS

| | | | |
|---|---|---|---|
| 4,459,663 | 7/1984 | Dye ...................................... | 364/200 |
| 5,077,661 | 12/1991 | Jain et al. ............................. | 364/402 |
| 5,119,307 | 6/1992 | Blaha et al. .......................... | 364/468 |
| 5,177,688 | * 1/1993 | Rentschler et al. .................. | 700/101 |
| 5,197,001 | 3/1993 | Mukherjee ........................... | 364/403 |
| 5,249,120 | 9/1993 | Foley .................................... | 364/401 |
| 5,315,509 | 5/1994 | Natarajan ............................. | 364/401 |
| 5,548,518 | 8/1996 | Dietrich et al. ................. | 364/468.06 |
| 5,980,086 | * 11/1999 | Kanematsu et al. ................. | 700/101 |

OTHER PUBLICATIONS

Costanza, John R., "The Quantum Leap In Speed To Market", John Costanza Institute of Technology, Inc. (1996). pp. 1–352.

Shingo, Shingeo, "A Stud Of The Toyota Production System" (1989), pp. 1–257.

* cited by examiner

Primary Examiner—William Grant
Assistant Examiner—Steven R. Garland
(74) Attorney, Agent, or Firm—Merchant & Gould P.C.

(57) ABSTRACT

A demand-driven, mixed-model manufacturing line design system utilizes Demand Flow Technology to design an efficient mixed-model manufacturing line. Concurrent manufacture of several products in a continuous flow, mixed-model product line designed utilizing the design system exhibits essentially none of the inefficiencies associated with mixed-model, batch-oriented manufacturing lines. The method according to the present invention includes a product synchronization step for synchronizing product flow between unit processes, a resource balancing step to ensure sufficient resources are provided at each process, thereby reducing the product cycle time at each process to be approximately equal to an operational cycle time calculated for each process, a cell definition step for consolidating constant volume processes, an operational definition step for grouping tasks associated with the consolidated processes within each cell, and an operation balancing step for defining additional cells based on actual product cycle time diversity. A design system according to this invention includes a computer system wherein machine readable code accessible to the computer system enables execution of the above described method.

18 Claims, 16 Drawing Sheets

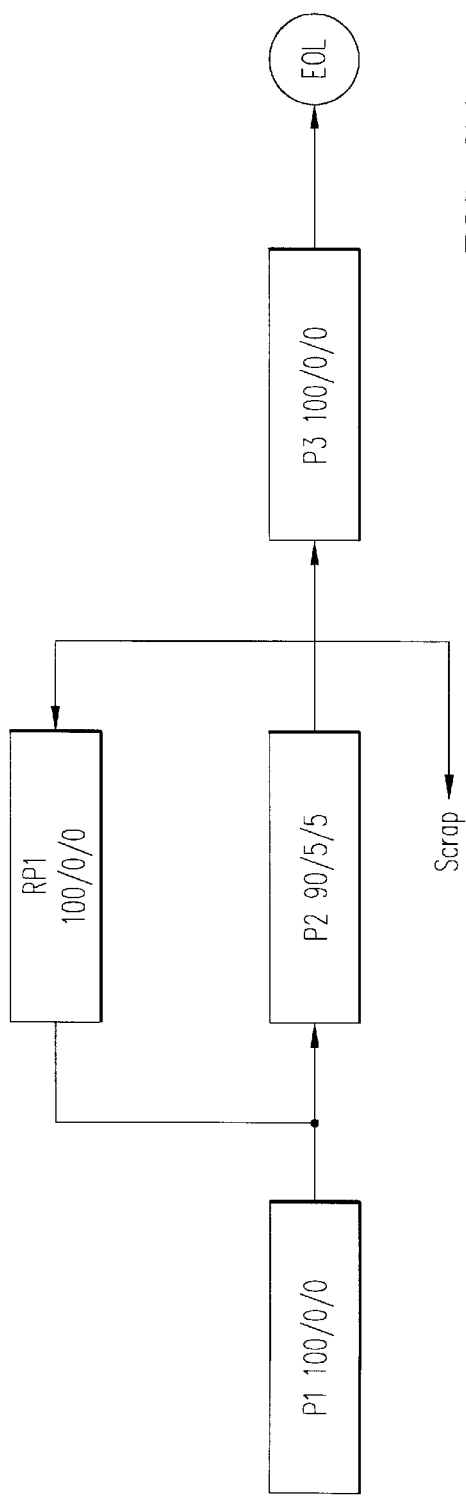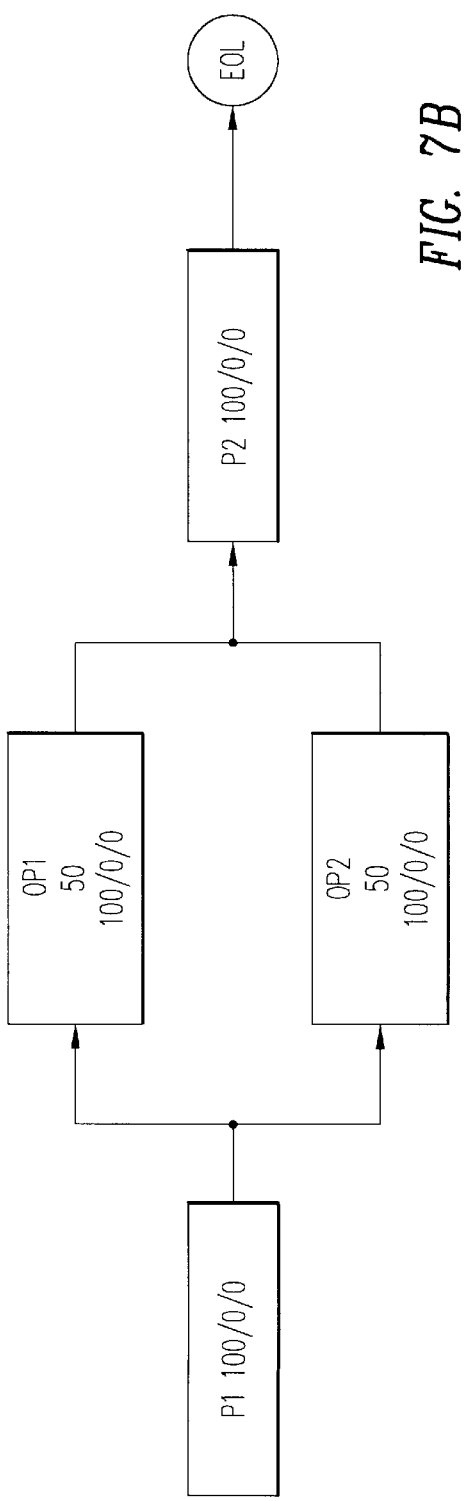
FIG. 7A
FIG. 7B

SYSTEM AND METHOD FOR DESIGNING A MIXED-MODEL MANUFACTURING PROCESS

BACKGROUND

1. Field of the Invention

This invention relates to computer systems and methods for process design, and more particularly to a computer system and method for designing a mixed-model manufacturing process.

2. Description of the Related Art

When designing a manufacturing process, the tasks performed by individual workers and work stations and the physical flows between work stations and materials storage areas must be considered. To make a product, the process design engineer prepares drawings and charts which indicate the various components and subassemblies going into the product as well as the sequence of events that should be followed in combining them. The resulting manufacturing line design is straight forward since a single-model product may be made in a single, static manufacturing line.

The design of a mixed-model manufacturing line, on the other hand, must be consistent with a process technology strategy that will permit making all functional variations (i.e., models) in a family of products. The wide variation in product features and functionality necessitates flexibility in the manufacturing line in order to accommodate the various process changes, customer demanded changes and material variations associated with the variety of products in the family of products. Conventional mixed-model manufacturing lines are organized into fairly autonomous departments grouped by either like-equipment or like-skills in order to produce various components of the products.

To produce each product, the manufacturing line for each product includes a set of processes. Traditionally, mixed-model process lines use batch processing since only a single product "run" is produced at any given time. The path of individual products through various work stations and departments is specified using "routing sheets," which contain the operating steps and routing required for each part, and "process flow charts," which describe the desired sequence of specific tasks (e.g., inspections, movements, and storage operations) for that product.

One problem with conventional mixed-model manufacturing lines is that the variety of products produced by the factory are forced to compete for manufacturing resources and equipment. This competition for resources manifests itself in the batch scheduling where only one product is manufactured at a time. This batch scheduling in turn results in long manufacturing latency, or lead time, for other products. Costs associated with this latency include the opportunity cost of customers unwilling or unable to tolerate the long manufacturing lead times, the costs of re-tooling a machine or work station when switching production from one product to another, and the costs of maintaining sufficient work in process (WIP) at each of the processes to permit filling anticipated product orders.

Customers who are unwilling or unable to tolerate a long manufacturing lead time will look to other sources to fill their demand. Lost customers affect the factory's profitability as they represent lost revenue.

Retooling increases the product's manufacturing cost. In that event, either the cost is absorbed by the factory, thereby reducing unit profit, or else the cost is passed on to the customer in the form of higher selling prices. Unless the product is unique and unavailable elsewhere, a higher selling price usually results in lower demand and, consequently, in lower revenues for that product.

Work-in-process represents a lost opportunity cost. Material and labor in WIP represents tied-up capital that cannot be recovered until processing has been completed and the finished goods (the products) are shipped to the customer.

Manufacturers have developed various manufacturing strategies which seek to mitigate some of the costs associated with mixed-model manufacturing process lines. One strategy, commonly called "just-in-time" (JIT) manufacturing, teaches that just enough work is started to ensure that WIP is minimized. This strategy, however, does not alleviate the batch scheduling inefficiencies of mixed model manufacturing lines, and may result in an excess amount of finished goods inventory. The capital that was invested in WIP is, in JIT processing, invested in finished goods. Other strategies that promise to solve the problems of manufacturing processes, such as "total market quality" (TQM) and the like, suggest changes in the way conventional mixed-model manufacturing lines are managed but do not solve the problems of conventional mixed model manufacturing lines. Accordingly, use of these various strategies has resulted in improvements to the batch-oriented scheduled processing associated with a mixed-model manufacturing line, but the fundamental problems of manufacturing latency, retooling, and unfinished and finished goods inventory remain.

Another problem with conventional mixed-model manufacturing line designs is that dissimilarity in the types of processes used to manufacture the various products introduces resource inefficiencies, such as machine and labor inefficiencies, associated with idle process lines. As discussed above, conventional mixed-model manufacturing is a batch process in which a process group or department works on only one particular product at any given time. Work orders are used to schedule and issue materials required to create the components and subassemblies of that product. These materials are batch-processed into the components and subassemblies, and then staged as WIP until the next process is ready to receive them. During the time the batch process is occurring, the WIP in upstream processes must wait until it can be scheduled into the current process, thereby tying-up capital in the upstream WIP. In addition, downstream processes may be idle while the upstream process completes the batch processing. This idle machine time and the labor and overhead required to maintain the upstream idle process represents an undesirable inefficiency and an additional cost to the factory. The accumulation of WIP and the frequency of idle processes is aggravated when the actual process time (the time to process a standard batch size) at each process is different.

It is thus apparent that there is a need for a system and method for designing a mixed-model manufacturing process line which eliminates manufacturing latencies, and which embodies manufacturing efficiencies and WIP control without incurring a large finished goods inventory. There is also a need for a system and method for designing a mixed-model manufacturing process line which coordinates resources and processes to eliminate idle processes caused by batch-process delays, and delays due to process time imbalances.

SUMMARY OF THE INVENTION

In accordance with this invention, a demand-driven, mixed-model manufacturing line design system and method permit design of a mixed-model manufacturing line for concurrent manufacturing of product families. The resulting mixed-model manufacturing line, or Demand Flow™ (DF) line, exhibits essentially none of the inefficiencies associated with the mixed-model, batch-oriented manufacturing lines of the prior art.

Embodiments of the invention include a computer and software for implementing a method of designing a demand flow manufacturing line. In most embodiments, the computer includes input devices (e.g., keyboards, pointers, and bar code readers), display devices (e.g., video terminals and printers), internal memory (e.g., RAM and ROM) for storing data and program instructions, a fixed memory (e.g., magnetic hard drives, floppy drives, CD ROM drives) for long term storage of data and programs, and a CPU that interacts with the input devices and the display devices and processes data according to program instructions.

Embodiments of the method incorporated in the program instructions include algorithms for product and process definitions and balancing or synchronization of product flow. Each product in the family of products to be manufactured by the manufacturing line is defined in terms of a set of processes that are used to manufacture that product. A process is defined in terms of a set of tasks for making the product and is parametrized in terms of process yield, process path type and other parameters. Processes are characterized in that product fallout (e.g., scrap or routing onto a rework or option path) only occurs during the final task of the process. Processes are members of process paths. Process paths are sequences of processes and can be categorized as one of four types: a main path, a feeder path, an option path, or a rework path.

Once each product is defined in terms of a set of processes, families of products that share a particular process are defined. In addition, knowing what the final end-of-line demand-at-capacity will be for each product, a demand-at-capacity for each process can be determined. The demand-at-capacity is the maximum amount of total product that the manufacturing line or process is required to produce. For example, if the manufacturing line is required to produce 100 units of product A and 100 units of product B, the total demand-at-capacity at end-of-line (EOL) is 200 units. If both products are members of a family of products defined in terms of process C, then process C has a demand-at-capacity of 200 units. In some embodiments, a demand-at-capacity for each product at each process is determined.

Following the demand-at-capacity calculation, an operational-cycle-time (alternatively referred to as the takt time) is calculated. The operational-cycle-time is defined as the maximum amount of time in which a unit of product or a component for a unit of product must be produced by a process in order to ensure that the demand-at-capacity for that product at that process is satisfied.

The takt time for each process can be balanced, resulting in a continuous mixed-model process flow, by adjusting the operating hours for the process (i.e., by placing additional resources in the process), relocating work, or redesigning product definition or process sequences so that the takt time for each process is approximately a constant. When the balancing is completed, the manufacturing line to accommodate the demand-at-capacity for each product in the family of products manufactured includes sequences of processes that produce to the takt time (i.e., all of the processes take approximately the same time to complete). The continuous mixed-model process flow defined in this fashion, therefore, eliminates WIP accumulation and idle processes. Additionally, the concurrent manufacture of mixed models (i.e., products) essentially eliminates long manufacturing lead times associated with traditional batch-processing manufacturing lines.

In some embodiments, further balancing of the manufacturing line is incorporated. Each of the products can additionally be defined in terms of the work content performed at each process that defines the product. The work content is defined by a sequence of events that in turn is defined as a series of tasks. Some embodiments include a standardized sequence of events to facilitate definition of processes and work contents. Each task in a sequence of events can be characterized in terms of work content times for machines and labor and an attribute for indicating whether the work content adds value to the product or does not add value to the product. For example, machine set-up and transport tasks do not add value to the product. Manufacturing line improvements that eliminate or reduce tasks that do not add value may then be incorporated.

In another embodiment, a demand weighted average cycle time is computed for each process. The demand weighted average cycle time can be computed from the demand-at-capacity for each product at each process and the actual time for each product to pass through each process. The demand weighted average cycle time for each process is compared with the takt time. If the demand weighted average cycle time for a process significantly exceeds the takt time for that process, the number of resources used to perform that process can be increased until the demand weighted average cycle time is acceptably comparable with the takt time.

In accordance with another embodiment of the methods of this invention, each process can be redefined as at least a portion of a cell. A cell is defined as a grouping of dissimilar resources (for example, people and machines) in a logical and sequential manner to facilitate the flow of a product or a family of products. Different products that flow through the cell may require different times. A cell is usually characterized as a series of processes with similar work contents (i.e. taking similar times). Processes having product fallout (i.e., less than 100% yield) are typically delegated to the last process in a cell or isolated in an independent cell, however these processes may also occur within cells. In one embodiment, each process defines a cell. In another embodiment, a cell is defined by adding sequential processes to the cell under the direction of a user of the design system. In yet another embodiment, the design system defines cells by adding sequential processes to the cell in accordance with some requirement such as that the cell does not exceed a maximum work volume. Once the cells are defined, operations within the cell can be defined. Operations can be defined according to machine dominated tasks if the work content is dominated by machine work, according to labor dominated tasks if the work content is dominated by labor, or according to general mixed tasks. An actual cycle time for each operation in each cell can be calculated and compared with the takt time of the cell, which relates to the takt time of the processes within the cell, to calculate a time index. To balance the operations in the cell, the time index is arranged to fall within a defined range by modifying the cell. These modifications include reducing the work content time per task, reducing move or setup times, identifying overlap times, adding resources, building up resources in upstream processes to compensate and increasing the operating time of the operation, and redesigning processes or products.

Finally, the family of products that is produced by the manufacturing line can be balanced such that the flow of each product through each process requires a process time that does not exceed a time index limit. For each product at each process, a time index can be calculated by comparing the actual time for that product to flow through that process with the takt time for that process. If the time index falls outside of a predetermined range, the product can be removed from the product family and placed within an alternate product family having similar characteristics. The removed products may, then, be dropped from the manufacturing line, or produced in a separate manufacturing line, or may flow through a separate option path that includes the offending process. The resulting manufacturing line operating on the remaining family of products is balanced such that each product requires approximately the same time as every other product to flow through each process.

These calculations and redefinitions described above may be iterated multiple times until an optimized manufacturing line is designed. In some embodiments, daily manufacturing line management can be accomplished. Given the actual product demand for a given day, for example, the actual required resources for that day can be determined and unused resources can be idled. For example, a process that utilizes multiple identical machines may, on a given day, require many fewer machines or none of the machines. Additionally, resource utilization in the manufacturing line can be calculated and monitored from the actual demand for products.

Embodiments of this invention are described below in relation to the figures.

BRIEF DESCRIPTION OF THE DRAWINGS

FIG. 7A shows a block diagram of a portion of a manufacturing line having a rework path.

FIG. 7B shows a block diagram of a portion of a manufacturing line having an option path.

Figure 1:
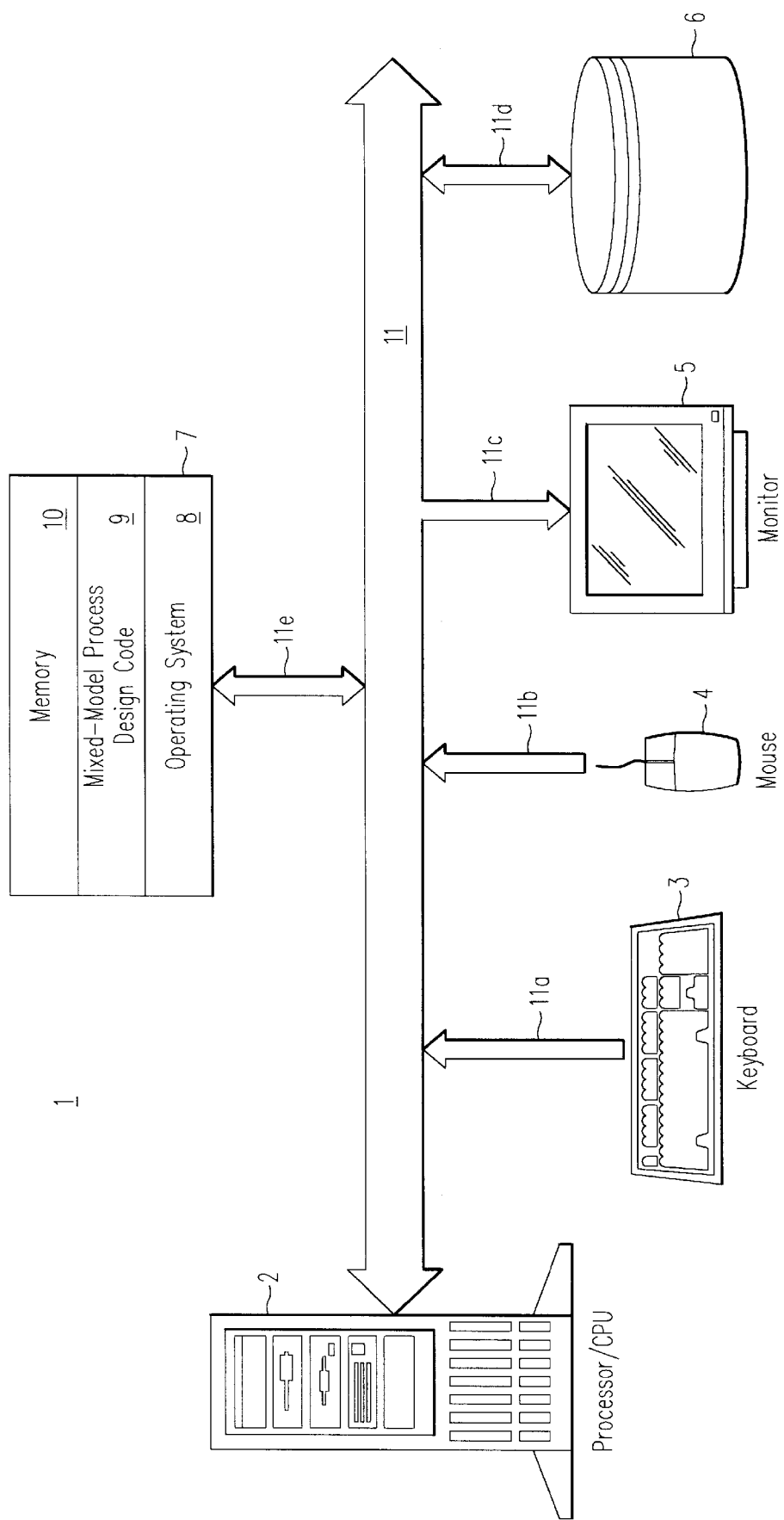
FIG. 1 is a conceptual block diagram of a computerized mixed-model manufacturing process design system according to the present invention.

In the figures, elements having the same or similar functions have the same identifying label.

DETAILED DESCRIPTION OF THE INVENTION

While the invention is described below with reference to certain illustrated embodiments, it is understood that these embodiments are presented by way of example and not by way of limitation. The intent of the following detailed description is not to cover all modifications, alternatives and equivalents as may fall within the spirit and scope of the invention. For example, it is understood by a person of ordinary skill practicing the method according to this invention that a balancing of resources may be performed after cells have been defined rather than before. It is also understood that the calculations are presented by way of example and that a person skilled in the art, in view of the disclosure of this invention, may utilize other algorithms to perform a demand-pull, mixed-model manufacturing line design according to this invention.

Definitions

The following definitions are listed here as an aid to understanding the description of embodiments of the invention:

| | |
|---|---|
| actual cycle time (AT) | The actual cycle time is the actual amount of time required to perform a task, process, or sequence of processes for a product. The actual cycle time for product i at process j, $At_{ij}$, is the actual amount of time required for a unit of product i to flow through process j. |
| cell | A grouping of dissimilar resources (for example people and machines) in a logical and sequential manner to facilitate the flow of a product or a family of products. |
| demand weighted average cycle time (ATw) | The demand weighted average cycle time is the average actual cycle time weighted by the demand-at-capacity. For example, the demand weighted average cycle time at process j, $ATw_j$, is the sum over all products of the demand-at-capacity for each product at process j multiplied by the actual cycle time for each product at process j divided by the total demand-at-capacity at process j. |
| demand-at-capacity Dc | The demand-at-capacity, Dc, refers to the maximum demand for a product. Demand-at-capacity may also refer to the total demand for all products. For example, the demand-at-capacity for product i at process j, $Dc_{ij}$, refers to the maximum number of product units required to produce product i that process j is expected to produce. |
| downstream process | Refers to a process in the same process path or sequence that occurs closer to the end-of-line. |
| end-of-line (EOL) | The end-of-line is the final point on the manufacturing line. The product is completed at this point on the manufacturing line and is in the form of finished product or finished goods. |
| family of products | A family of products is a grouping of products based on a common feature. Two primary examples of families of products include all of the products that are manufactured by the manufacturing line and all of the products defined in terms of a particular process. |
| feeder path | A feeder path manufactures sub-assemblies or components of products in the family of products manufactured by the manufacturing line. Feeder paths run parallel to another production path and terminate by insertion of the manufactured sub-assembly or component into the process |

-continued

| | |
|---|---|
| main path | A main path is a process path that terminates at the end-of-line. This process path is typically the principal production path used to manufacture products and is shared by all or most of the products in the family or products produced by the manufacturing line |
| operational-cycle-time (OPc/t) | The operational-cycle-time, or takt time, is the maximum amount of time that a process or sequence of processes can use to produce a unit of product. The operational cycle time for a particular process, (OPc/$t_j$, is the maximum amount of time that process j can use to produce a unit of product and meet the demand-at-capacity requirements at EOL. |
| option path | An option path is a process path wherein the work content imparted to the product results in functional or cosmetic changes to the product that are different from those imparted to products in alternate option paths. Option paths are typically responsible for the performance and appearance differences between products. Option paths input product from a down-stream process in the production path. |
| process path | A process path is a sequence of processes. Process paths can be categorized into one or four basic types: main paths, option paths, feeder paths or rework paths. |
| process yield | The process yield refers to the ratio of the units of product that exit a product to the units of product the enter the process. A process having less than a 100% yield results in a scrap output or output to a rework path. |
| product | A product refers to the manufactured item. The product can be defined in terms of the sequence of processes required to produce the product. Additionally, a quantity of product at a process refers to the material in the process used to produce the product. One unit of product is the amount of material that exists in one final product. |
| product fallout | Refers to the amount of product that leaves the process path, usually as scrap, or by entering a rework path. |
| Product/Process map | A matrix indicating which processes are included in the definition of each product |
| product/task work content map | A matrix indicating the work content imparted to each product by tasks in a process. |
| resources | Resources refers to individual machines or quantities of labor. The amount of resources, for example, can be increased for a particular task by increasing the number of machines or people or by increasing the number of hours that the machines and people work. |
| rework path | A rework path inputs rejected (i.e., out-of-specification) quantities of product from a process, remedies the fault in the quantities of product and re-inserts the quanitites of product into an upstream process in the process path. In some cases, the rework path inserts quantities of product at the point in the process path where rejected quantities of product were diverted into the rework path. The point of insertion of the recovered quantities of production into the manufacturing line depends on the effective cumulative work content of the quantities of product and will typically be at point in the process path where first-run parts have the same cumulative work content. The effect of the rework path is to increase the effective yield of the process from which the rework part originated. |
| sequence of events (SOE) | The sequence of events refers to a sequential sequence of tasks. In some embodiments, standardized sequences of events (SSOE) are defined. |
| takt time | See operational cycle time |
| task | A task is a small unit of work. A task is usually defined in terms of work content and the resources required to impart the work content to the product. |
| time index | A time index is a comparsion of a time, usually an actual cycle time for a process, an operation, or a cell, with a takt time for that process, operation, or cell. The comparison is typically a ratio of the two quantities. |

-continued

| | |
|---|---|
| upstream process | Refers to a process in the same process path or sequence as the current process but occurs towards the beginning of the manufacturing line. |
| work content or work content time | Work content refers to the amount of working time that hs been invested in a quantity of product. A process or process path can impart work content to a product. Work content includes machine and labor work times, machine and labor setup times and move times. Work content from a particulr process or task may be characterized by whether the work adds value to the final product or does not add value to the final product. Work content may also be petitioned into machine work and labor work. |
| Work in Process (WIP) | Product units that exist in the manufacturing line. WIP can include subassemblies and components of the finished product. |
| work volume (throughput) | The amount of product that flows through a process, task, or process path in order to produce the demand at capacity amount of product at the end-of-line. |

Description

FIG. 1 shows a computerized mixed-model flow manufacturing design system 1. Design system 1 includes at least one processor 2, at least one input structure such as a keyboard 3, a mouse 4, or other input device such as a bar code scanner, at least one visual display such as a monitor or printer 5 and program and data storage means 6 such as a holographic, magnetic, or optical storage unit and main memory 7 including volatile and non-volatile program and data storage devices. Main memory 7 may include RAM, DRAM, SRAM, or other computer readable medium. Machine readable code for controlling design system 1 according to the present invention is embodied on the program and data storage means 6 and read into the main memory 7 at the time of execution. Main memory 7 includes an operating system code 8, computer code 9 for effectuating the mixed-model manufacturing design method of the present invention, and at least one additional memory space 10 for storing programs and data. At least one bus 11 (busses 11a, 11b, 11c, 11d and 11e are shown in FIG. 1) provides electronic communication between the elements of design system 1.

Computer code 9 on computer main memory 7, or alternately on storage unit 6, includes machine readable code segments of a computer program according to the present invention. Computer code 9 directs computerized mixed-model flow manufacturing design system 1 according to embodiments of the present invention.

Figure 2:
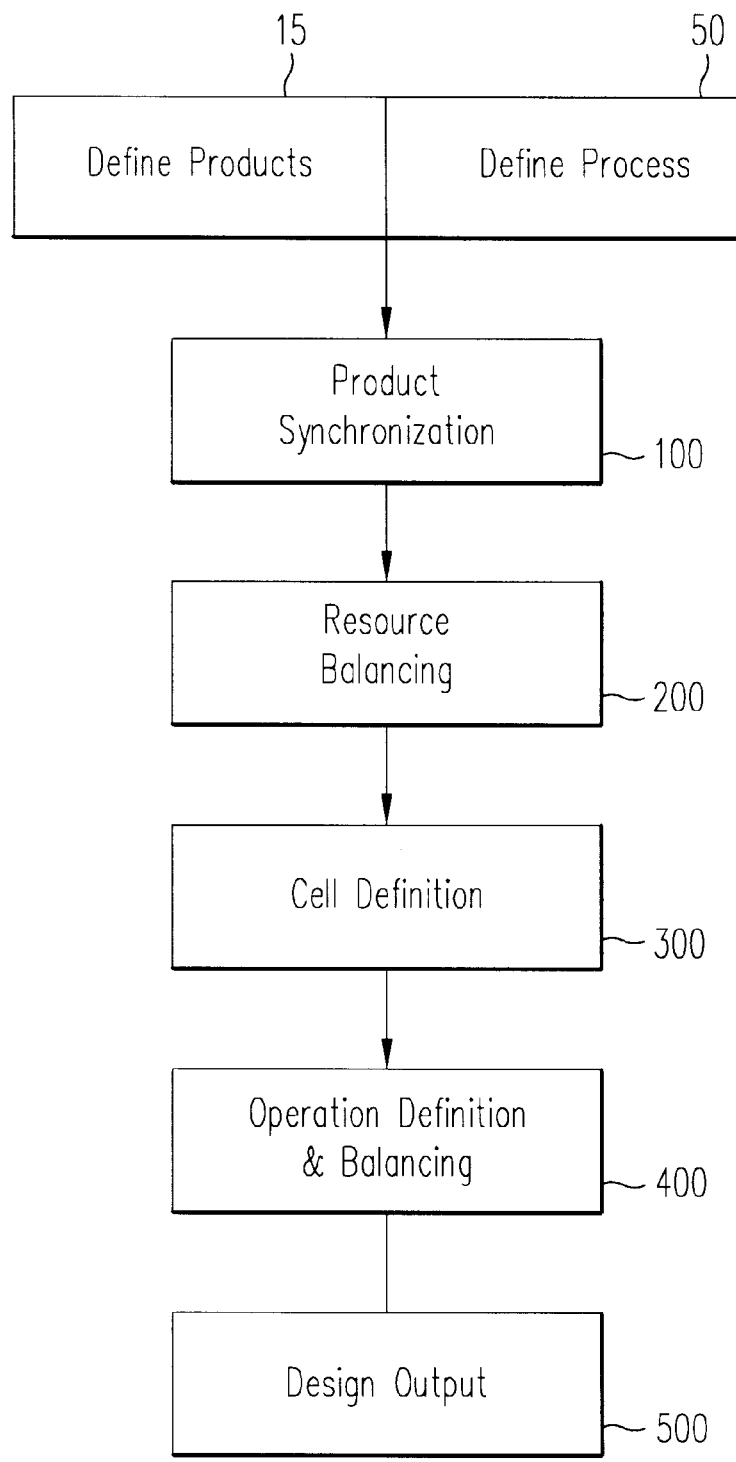
FIG. 2 is a flow diagram overview of one embodiment of the mixed-model man acturing design method according to the present invention.

FIG. 2 shows a block diagram of one embodiment of the method for designing a mixed-model manufacturing line. The method is implemented in software that is executed in design system 1 of FIG. 1.

In product definitions 15 the definition of a product in terms of the processes required for manufacturing that product is inputted. In process definition 50, each process in the manufacturing line is defmed and characterized. Each product in the family of products that is to be manufactured by the manufacturing line is defined and stored as data. Typically, user input is required for product definition 15 and process definition 50, and more than one product and process will be defined. Processes are defmed in terms of process parameters that are inputted and stored for use in subsequent calculations. Process parameters include:

process yield (e.g., the amount of product that flows to a subsequent process with respect to the amount of product that entered the present process);

process path type attributes (e.g., main path, feeder path, option path, or rework path);

process identification indicating the position of the process in a sequence of processes;

if the process is a member of an option path, the amount of product that is routed to the option path and the identification of the process to which the option path directs its outputted amount of product; and if the process is a member of a rework path, the identification of the process to which the rework path directs its outputted amount of product.

Additionally, the tasks required for each process and the individual work times for each task by product are inputted into the system and stored.

The result of the product synchronization step 100 is to define families of products that share a common process, calculate the demand-at-capacity for each product at each process, and calculate the work content time for each product at each task in each process.

In resource balancing 200, an operational cycle time defining the maximum cycle time for each product unit at each process is calculated and compared to a weighted average actual cycle time for that process. Resources at each process are balanced (for example, by adding additional machines or people) so that the actual weighted cycle time is approximately equal to the operational cycle time.

In cell definition 300, cells are defined. A cell is a logical grouping of dissimilar resources in a logical and sequential manner to facilitate the flow of quantities of product through the manufacturing line. Organizing machines and people into cells reduces or eliminates queues, reduces setup times, and reduces throughput times in a mixed-model manufacturing flow line. In some embodiments, each cell may be defined to include a single process. In other embodiments, a cell may be defined to include multiple processes. In other embodiments, a cell may group additional manufacturing tasks associated with other processes so long as those additional tasks are logically, and conveniently, grouped with the manufacturing tasks already within that cell. In some embodiments the additional tasks represent the tasks associated with contiguous processes, thereby grouping dissimilar machines.

In one embodiment, an automatic cell definition is accomplished by product model balancing. Since the resources for each process were based on a demand weighted average product cycle time, individual product cycle times at each cell may be significantly greater than or less than the operational cycle time. Cell definition 300 can balance each cell against the family of products and provides for the creation of additional cells or process paths for those products having cycle times significantly greater or less than the calculated operational cycle time of the processes comprising the original cell.

The tasks identified with each of the processes comprising the cell are regrouped into operations at operation definition 400. Operations are defined such that the total time for the group of tasks at each operation is within a predetermined range around the previously calculated operational cycle time. Conveniently, if the processes were previously balanced (i.e., the processes are defined such that actual time to complete each process is approximately the takt time) prior to forming cells, the actual cycle time for the group of tasks within each operation will tend to be within the predetermined range around the operation cycle time.

Design output 500 outputs the results of mixed-model manufacturing design system 1. The results are then implemented at the manufacturing factory. The components of the method shown in FIG. 2 are implemented in the mixed-model manufacturing design system 1. Each of the steps in FIG. 2 is further explained below.

1. Product Definitions 15 and Process Definitions 50

Figure 3:
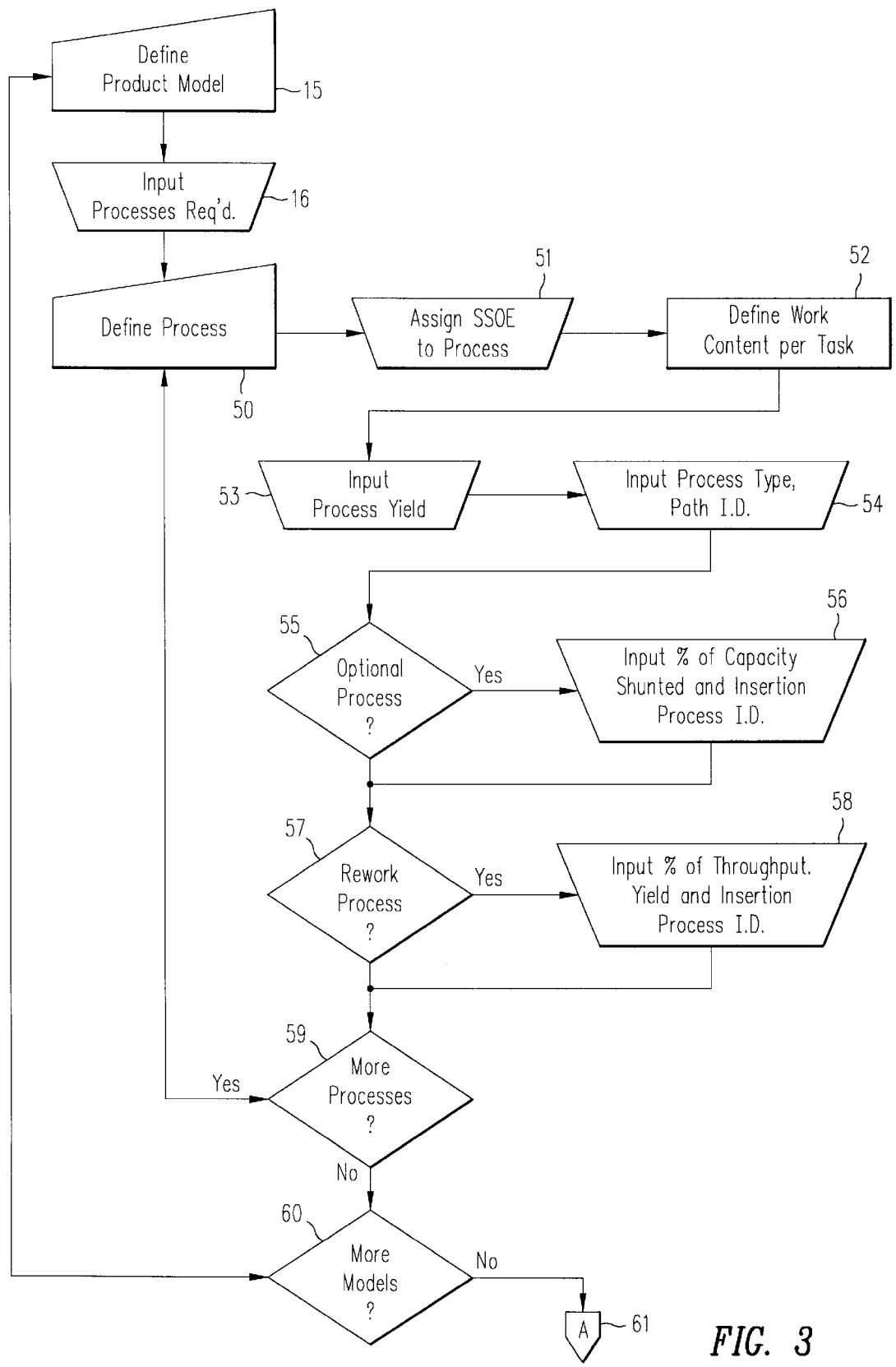
FIG. 3 is a detailed flow diagram of one embodiment of the product and process definition steps of the mixed-model manufacturing design method and system according to the present invention as shown in FIG. 2.

FIG. 3 shows a block diagram of one method according to an embodiment of the present invention for performing define process 50 and define product 15. The product models to be manufactured on the proposed manufacturing line are defined at define product 15 in terms of the processes required for their manufacture. These processes are inputted for each product model at input processes 16. The process definition for each product model includes assigning a sequence of events to each process in Assign SSOE 51. The specific tasks included in the sequence of events (SOE) are, in this embodiment, selected from a standardized sequence of events (SSOE) list. Alternatively, the sequence of events, and the tasks that constitute the SOE, can be defined at this step. The work content for each task identified is estimated and input into the system at define work content step 52. The work content includes machine and labor work content times, machine and labor setup and move times, and a flag indicating whether the task is "value-add" or "non-value add" work content. Additional information inputted for each task includes whether the machine and labor work content time within the task overlap, and whether the machine and/or labor work content times overlap with the machine and/or labor work content times of other tasks included in the SOE for that process.

Global process variables are obtained in steps 53 and 54. The global process variables include, but are not limited to, process and path I.D.s (locating the process in a manufacturing sequence by production path and location in the production path), a process yield and a path type. In the event that the process yield inputted at step 53 is less than 100 percent, the percentage of product directed towards a rework path and scrap are also inputted at input process yield 53. The process type is inputted at input process type 54. Process types in this embodiment are determined by whether a process is a member of a main path, feeder path, rework path, or option path. Examples of the process paths are graphically shown in FIGS. 7A through 7C.

A main path is a process path that terminates at an end-of-line (EOL) where the finished product leaves the manufacturing line. For example, in FIG. 7A, process P1, P2 and P3 are main path processes.

A feeder-path inserts components or subassemblies into another production path. For example, in FIG. 7C, process FP1 and FP2 are feeder path processes.

A rework path removes a quantity of component from a production path and reinserts a re-worked quantity of component into the production path at an insertion point that precedes or is the same as the process where the quantity of component was removed. For example, in FIG. 7C process RP1 is a rework path process that accepts inputted quantities of product outputted from feeder path process FP2 and reinserts reworked quantities of product at feeder path process FP1.

An option path is used to produce products not produced in the main path or, in some manufacturing lines, to produce individual variations (such as differing product features) between products. For example, in FIG. 7B, one option path includes option path process OP1 and a second option path includes option path process OP2.

In order to fully characterize feeder path processes, additional information is inputted, including: the quantity of sub-component that needs to be produced by the feeder path to manufacture one unit of finished product and an index indicating the process in the production path into which the feeder path directs the quantity of product that it outputs. The demand-at-capacity for each feeder path process is multiplied by the quantity of the component produced by the feeder path that is consumed per unit of product produced by the main-line path.

A rework path process must direct product in an upstream direction in the production path from which it originated. It may return to its originating process, to just prior to its originating task, to any prior process upstream of the originating process, or to its point of origin. If a product falls out of a main path and completes the remaining work to finish the product in a production path parallel to the main process path, then this parallel path is an option path.

In FIG. 3, optional process 55 identifies processes that belong to an option path. Option paths may occur in the main line path, in rework paths, or in feeder paths and run parallel to the respective production process. Unlike rework paths, option paths re-enter the respective production path at a process downstream from the option path's origination process. Alternately, option paths can insert into other option paths, or can go to the end-of-line (EOL) directly. Option paths may include rework paths to any process within the option path. If an option process is identified at option process 55, input block 56 inputs additional process information, including the percentage of the originating production path product that is shunted, or diverted, to that option process, and the production path process position index receiving the output of the option path. Rework process steps are recognized at step 57 and, for rework processes, input block 58 inputs additional information including the rework yield and the process position index of the process receiving the output of the rework production path.

If decision block 59 identifies additional processes in the product definition, the foregoing steps 50 through 58 are repeated for the next process associated with the product model. If, at decision block 59, it is determined that no additional processes have been identified for that product, decision block 60 determines if there are further products to define. If there are, then steps 15 through 59 are repeated for the next product model. If at decision block step 60 no more product models are to be defined, the product/process definition step is completed and the method of this invention continues to director 61 and the mixed-model flow manufacturing design system 1 (FIG. 1) proceeds to product synchronization 100 (FIG. 2).

2. Product Synchronization 100

According to the present invention, mixed-model product flow is synchronized between processes and within each process in accordance with product synchronization 100. Product synchronization 100 comprises:

1) taking product and process definitions from the databases created in define product 15 and define process 50 and calculating the demand-at-capacity for each product at each process;
2) calculating
   a demand weighted average cycle time for each process, and
   an operational cycle time for each process; and
3) adjusting the amount of resources at each process such that the demand weighted average product cycle time is within a predefined range around the operational cycle time.

Figure 4:
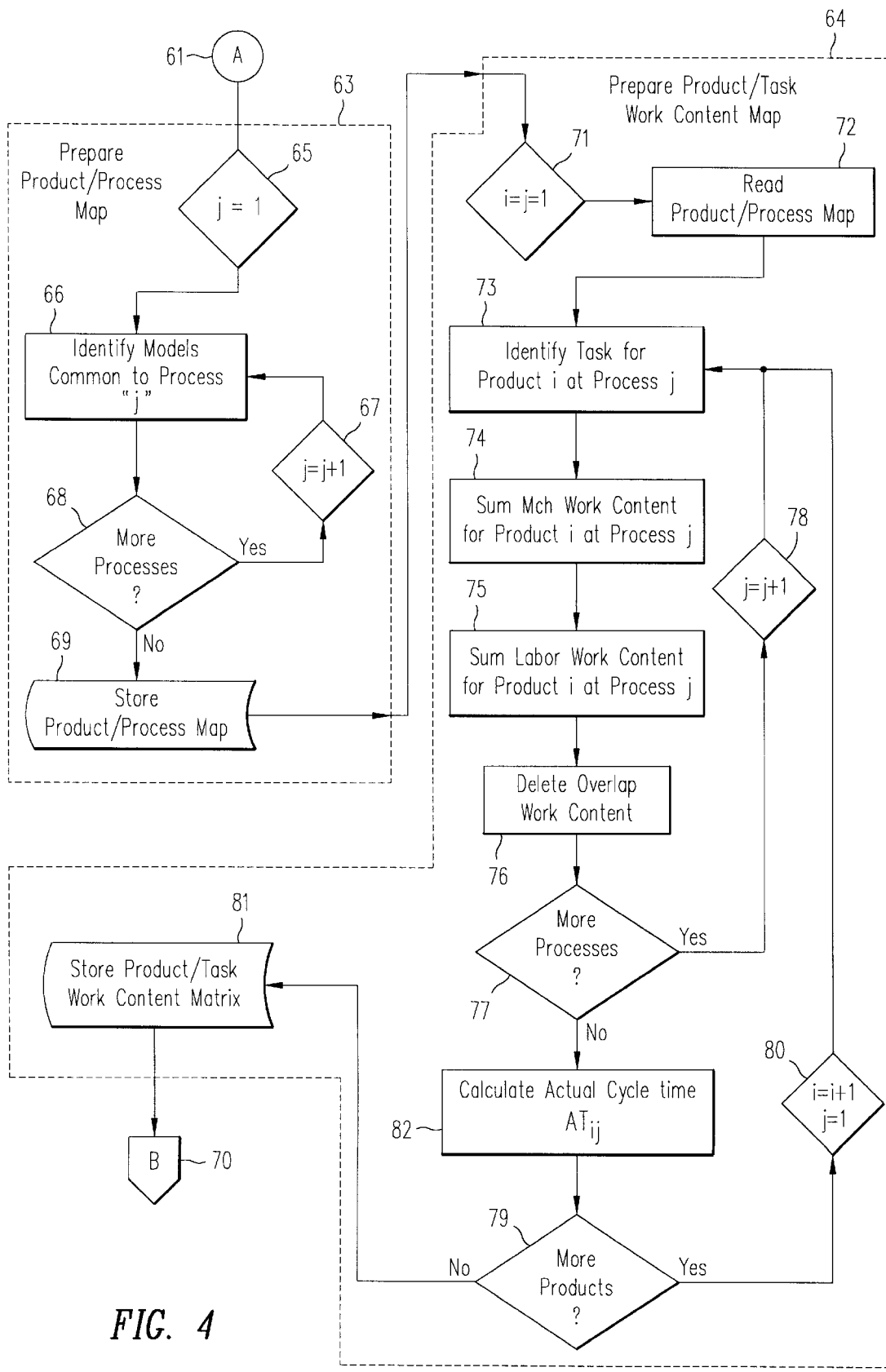
FIG. 4 is a detailed flow diagram of one embodiment of the product synchronization step according to the present invention as shown in FIG. 2.
Figure 5:
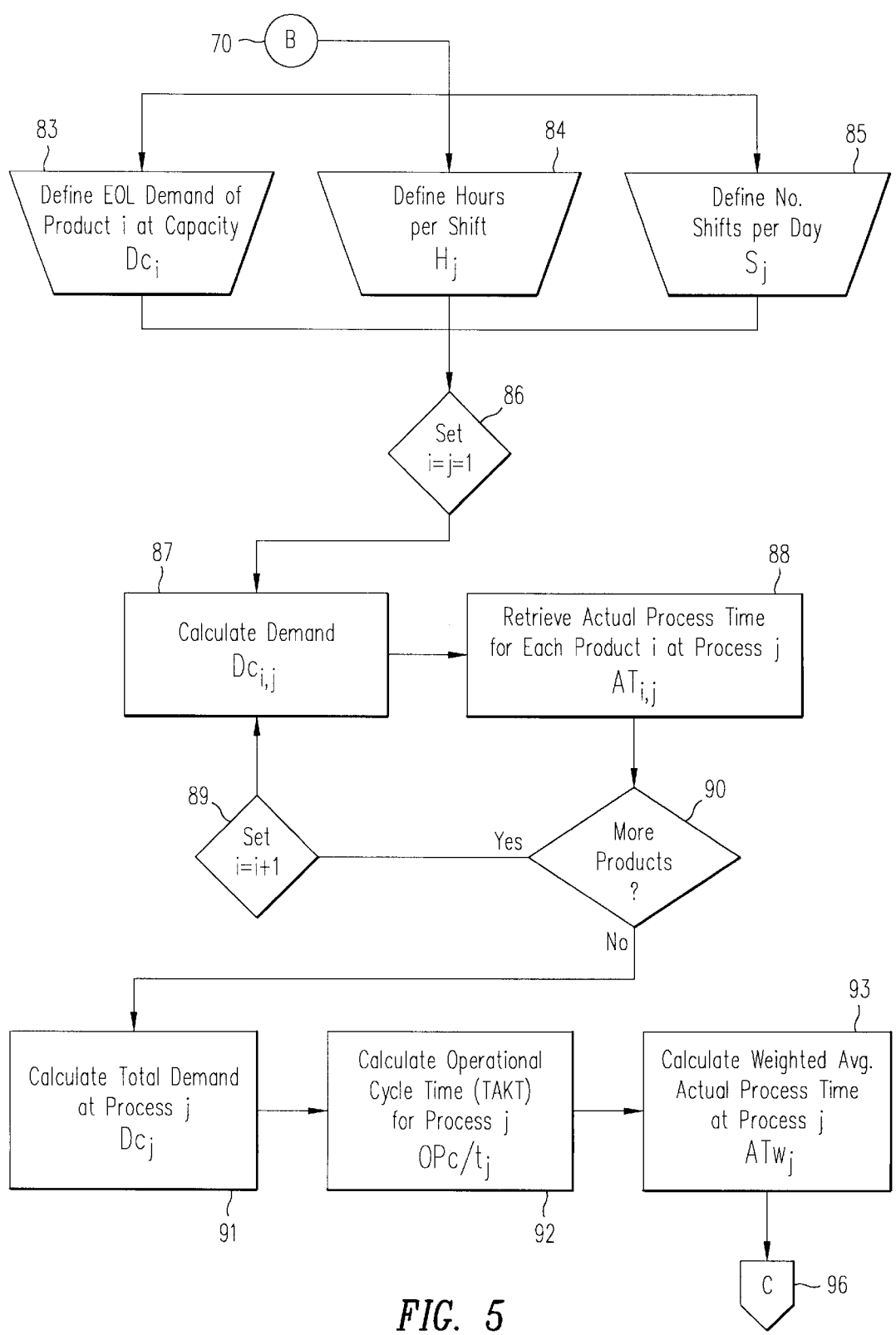
FIG. 5 is a detailed flow diagram of one embodiment of the calculation steps of the method and system according to the present invention preliminary to balancing process resources in a mixed-model manufacturing line design.

Product synchronization 100 is described in FIGS. 4 and 5 and includes the steps of assembling process design input matrices, such as a product/process map and a product task map from the input data provided according to the product definitions and process definitions described in FIG. 3. The process shown in FIG. 3 links with the process shown in FIG. 4 through director 61 (shown in both figures).

The process definition input matrices are calculated at step 62. The process definition matrices include a product vs. process map and a product/task work content matrix. Process 63 prepares a product/process map (alternatively referred to as a product/process matrix). Process 63 begins by initializing the process index j to 1 at step 65. All product models including process j in their process definition are identified in step 66 as a family of products. Query 68 determines if all processes have been analyzed. If additional processes remain, j is incremented in step 67 and process 63 returns to step 66. If all processes have been identified, a product/process matrix is generated by process 63. Process 63 stores the product/process matrix in a computerized mixed-model flow manufacturing design system 1 (see FIG. 1) in storage step 69. Some embodiments of the invention utilize other groupings of products to define a family of products, including products that include similar sets of processes in their definitions or other operator controlled definitions.

By way of example, a product/process map generated according to process step 63 is illustrated in Table I. Mixed-model flow manufacturing design system 1 may display such a product/process matrix on monitor or printer 5 of design system 1 (See FIG. 1).

TABLE I

| MODEL NO. | PROCESSES | | | | | | | | |
|---|---|---|---|---|---|---|---|---|---|
| | P1 | P2 | P3 | P4 | P5 | P6 | P7 | P8 | P10 |
| Model #1 | X | X | X | X | X | X |   | X | X |
| Model #2 |   | X | X | X | X |   | X | X |   |
| Model #3 | X | X | X | X | X | X | X | X | X |
| Model #4 | X | X | X | X | X |   |   | X | X |
| Model #5 | X | X | X | X |   | X |   | X |   |
| Model #6 |   |   |   |   | X | X |   | X |   |
| Model #7 | X | X | X | X | X | X | X | X | X |

In Table I, there are seven (7) products, labeled model #1 through model #7, defined in terms of ten (10) processes labeled P1 through P10. The "X" in each cell signifies that the corresponding process is included in the definition of the corresponding product model. Model #6, for example, includes processes P5, P6 and P8. The product-process map clearly indicates the family of products for each process. Models 1, 3, 4, 5 and 7, for example, are members of the family of products using process P1. Alternatively, the X's in Table I may be replaced by process yield, process type, or the value of any parameter or parameters that have been inputted for that process with respect to that product.

The set of process design input matrices may also include a product/task work content map. Preparation of the product/task work content map is accomplished in step 64. The product number i and process number j are each initialized to 1 at initialization step 71. In one embodiment, product number i refers to the product number in a family of products all having process j in common. The index j is a process number identifying a particular process in the set of processes defined across all product models. Other systems of indexing may be used to access and identify products within families of products.

The product/process map generated in process 63 is read at input 72 in order to identify the family of products associated with process j. In step 73, the tasks for each process j, in product i and their associated work content times (both machine and labor) and attribute data, inputted during steps 51 and 52 (see FIG. 3), are retrieved from memory 10 or from storage 6 (see FIG. 1). The machine work content times for all of the tasks defining process j in product i are summed during step 74. Labor work content times for process j in product i are summed during step 75. Overlap attributes for each task are identified and overlapping work content time is deleted in step 76, eliminating double counting of time, unless two independent resources are co-involved with performance of a task. Overlap work content times refers to work content time from two sources that occur simultaneously, such as the labor time and machine time in a task involving a manually operated machine. Work content time from two separate machines, even if the two machines are operating on the same quantity of product simultaneously, however, is included. Static quantities (work content independent of product volume or throughput), such as set-up times and move times, are included in the summations.

Once the work content summations and overlap adjustments for process j are completed, step 77 checks to determine if all processes have been analyzed. If additional processes remain for product i, then process number j is incremented to refer to the next process, and the work content for the next process in the manufacture of product i is analyzed according to steps 73 through 76. If at step 77 no more processes remain for product i, the actual cycle times for product i at process j are calculated at step 82. The actual cycle time, $At_{ij}$, is the sum of the machine work content and the labor work content for product i at process j less the overlap work content for product i at process j. A check for additional product models is made at step 79. If not all products have been analyzed, at step 80 the product index variable, i, is incremented and the process index, j, is re-initialized to 1, representing the first process in the sequence of processes required for the manufacture of product i+1. Steps 73 through 80 are repeated until all products and their processes have been analyzed. The resulting data and actual cycle times are stored in memory 10 (FIG. 1).

Off-page connector 70 continues product synchronization 100 (FIG. 2) onto connector 70 on FIG. 5. FIG. 5 shows the process of calculating the parameter values necessary to synchronize product flow in the manufacturing design method according to this invention.

The end-of-line (EOL) demand-at-capacity for each product, $Dc_i$, is inputted and stored at step 83. Alternately, these parameters may be inputted along with information regarding products and processes at an initial data entry step. The planned hours per shift at each process, $H_j$, and number of shifts per day at each process, $S_j$, are inputted and stored at steps 84 and 85, respectively. These parameters may be inputted from a central data base stored on storage 6 of mixed-model manufacturing process design system 1 (see FIG. 1) or may be inputted from a user. Initialization step 86 sets product counter i and process counter j both to 1.

The demand-at-capacity, $Dc_{ij}$, for product i at process j is determined at step 87. Various algorithms may be used to calculate $Dc_{ij}$. In some embodiments of the present invention, a derivative method is used whereby a starting value, x, is chosen for process 1 of each product i and the EOL yield is calculated, process-by-process, based on the yield at each process. The starting value x represents the number of units of product i that need to enter the manufacturing line in order that $Dc_i$ units of product are produced at EOL.

Rework paths in the process definition result in adjusting x until the desired overall demand-at-capacity $Dc_i$ for product i is obtained. In implementation, the computer system assigns a quantity $x_1$ to a first process and calculates an output quantity for the first process, $x_1$ being x adjusted for the yield of the first process. At least a portion of the output quantity $x_1$ is delivered as the input quantity to an adjacent downstream process (i.e., the next process in the path). The amount of product x that is carried forward to the next process is based on the amount of product x that is redirected toward rework and option process paths. The quantity x is dependent on the yield and scrap factors associated with the process.

The foregoing procedure is repeated through the entire production process path (including rework, option, and feeder production paths) until a final yield $x_F$ is calculated at the EOL. The final yield $x_F$ is used to calculate a multiplier which will adjust the final yield $x_F$ to be one. For example, if 87.5% of initial product x arrives at the EOL, then the multiplier is 1/0.875=1.14286. This multiplier is then applied to the starting process to determined the associated absolute amount of product throughput, output and scrap for each process.

In general, the calculation of demand-at-capacity for product i at process j, $Dc_{ij}$, in step 87 of FIG. 5 follows the following procedure, for each path:
1) consider a quantity of product x inputted to the product path (one unit of product is that amount of material present in one unit of final product);
2) follow the production path sequentially and, for each process in the production path
   a) determine the amount of product inputted to the process, including inputs of product from rework paths re-entering the production path at that point (i.e., an insertion point) and, if the current process is an optional process, the amount of product that is diverted into the optional path from the production path, and
   b) calculate the amount of material that is outputted from the process considering the amount of material directed into a rework path or a scrap path; and
3) determine the initial quantity of material by:
   a) if the product path terminates at the EOL, normalizing the output of the last process to 1 so that 1 unit of final product is produced, or
   b) if the product path is a feeder path, normalizing the output of the last process in the feeder path to be the amount of product present in the production path at the point where the feeder path terminates, taking into account the number of components per produced product that is required at the termination point of the feeder path.

In the calculations, the amount of product outputted from a rework path is included in the input of the process following the rework path insertion point in the production path. Feeder paths are balanced so that the number of components that arrive at the insertion point of the production path matches the requirement for those components at that insertion point. From the above-described calculations, the demand-at-capacity at each process j for each product i is calculated from the total demand-at-capacity for each product i that is previously inputted and stored in the mixed-model system 1 (see FIG. 1) during step 83 (see FIG. 5).

Figure 7C:
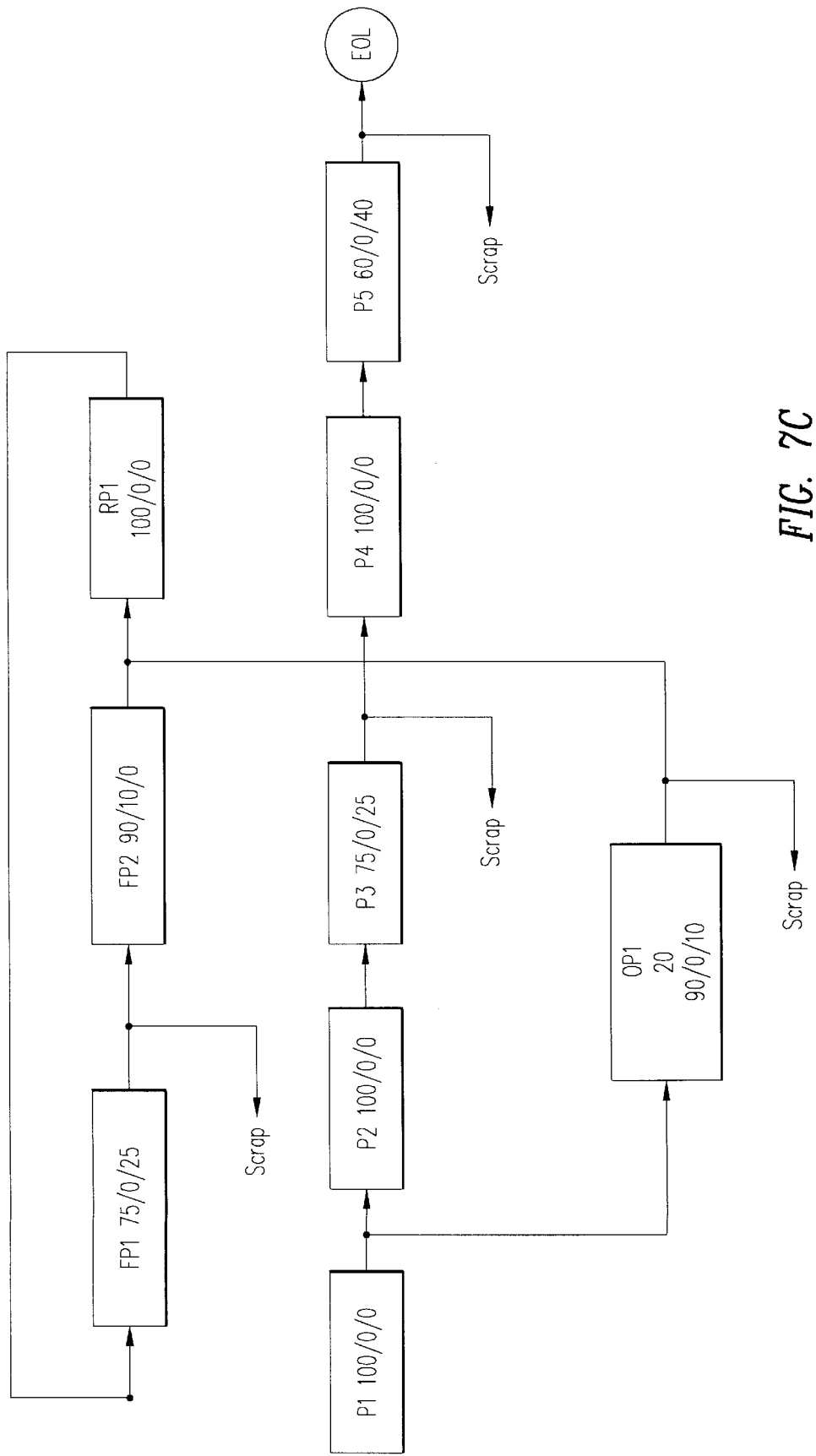
FIG. 7C shows a block diagram of a portion of a manufacturing line having a rework path and an option path.

The above-described method for calculating demand-at-capacity at each process is exemplified in the following discussion with reference to FIGS. 7A–7C. FIG. 7A is a block diagram showing a main process path comprising processes P1, P2, and P3, a rework path including rework process RP1, and a scrap output. The parameter designation "xxx/yy/zz" indicates the percent yield, the rework percentage (the percentage amount of product directed towards the rework path) and the scrap percentage (the percentage amount of product directed towards scrap), respectively, for that process. In the following discussion, a reference to the amount of "product" at a particular process refers to the amount of materials (or parts) present at that process that is required to produce a product.

The derivative process for calculating $Dc_{ij}$ for the manufacturing process line configuration of FIG. 7A includes:

1) considering a quantity of product x inputted to process P1;
2) calculating the amount of product outputted from process P1, which in this example is x because the yield of process P1 is 100%;
3) determining the amount of product inputted to process P2, which in this example is the amount of product outputted from process P1 (x) plus the amount of product y outputted from rework process RP1;
4) determining the amount of product inputted to the rework process RP1, which in this example is 0.05 (x+y);
5) determining the amount of product outputted from the rework process RP1, y, and solving for y in order to obtain the actual amount of product inputted to process P2, which in this example is 0.05 (x+y) because the yield of the rework process RP1 is 100%, therefore y=0.05 (x+y) and y=0.05/0.95x=0.0526x;
6) determining the amount of product inputted to process P3, which in this example is 90% of (1.0526)x, 0.947x, because the amount of product that is inputted to process P2 is (1.0526)x and the yield is 90%, with 5% going to rework process RP1 and 5% going to scrap;
7) determining the amount of product at EOL in terms of x, which in this example is 0.947x because the yield of process P3 is 100%; and
8) determining x such that the amount of product at EOL is normalized to 1, which in this example implies that x=1/0.947=1.0556.

TABLE II

| PROCESS/ID | PATH TYPE | YIELD | EXT-RACT'N | IN-SERT'N | IN/OUT |
|---|---|---|---|---|---|
| P1/1 | Main | 100/0/0 | N/A | N/A | 1X/1X |
| P2/2 | Main | 90/5/5 | N/A | N/A | 1.0526X/0.947X |
| P3/3 | Main | 100/0/0 | N/A | N/A | 0.947X/0.947X |
| RP1/1 | Rework | 100/0/0 | P2 Out | P2 In | 0.0526X/0.0526X |
| Scrap | N/A | N/A | P2 Out | N/A | 0.0526X |
| EOL | N/A | N/A | N/A | N/A | 0.947X |

Therefore, in the example of FIG. 7A, 1.0556 units of product must be inputted to process P1 in order for 1.0 unit of product to reach EOL. Table II shows the input parametric values and the calculated values of x for the manufacturing line of FIG. 7A, including the extraction and insertion points (the points at which material exits the production path or enters the production path, respectively) of the product streams.

FIG. 7B is a block diagram showing an example with a main path including processes P1 and P2, and two option paths including processes OP1 and OP2, respectively, all having 100 percent yields. As shown, the amount of product outputted at process P1 is split 50% to OP1, and 50% to OP2. The derivative method for calculating $Dc_{ij}$ for the manufacturing process line of FIG. 7B includes:

1) considering a quantity of product x inputted to process P1;
2) calculating the amount of product that is outputted by process P1, which in this example is x because the yield of process P1 is 100%;
3) determining the input to optional process OP1, which in this example is 0.5x because the parameter list for optional process OP1 indicates that 50% of the yield of process P1 is directed into optional process OP1;
4) calculating the amount of product that is outputted by process OP1, which in this example is 0.5x because the yield of optional process OP1 is 100%;
5) determining the amount of product inputted to optional process OP2, which in this example is 0.5x because the parameter list for optional process OP2 indicates that 50% of the yield of process P1 is directed into optional process OP2;
6) calculating the amount of product that is outputted by optional process OP2, which in this example is 0.5x because the yield of optional process OP2 is 100%;
7) determining the amount of product that is inputted to process P2, which in this example is x, the sum of the amount of product from optional processes OP1 and OP2;
8) calculating the amount of product that is outputted from process P2 to the EOL, which in this case is x because the yield of process P2 is 100%; and
9) calculating x so that the amount of product at EOL is normalized to 1, which in this example results in x being 1.

Table III shows the input parametric values and the calculated values of x for the manufacturing line of FIG. 7B, including the extraction and insertion points of the option product streams. From the above calculations, as illustrated in Table III, the multiplier factor is 1, i.e. for each unit inserted at process P1, one unit is produced at the EOL.

TABLE III

| PROCESS/ID | PATH TYPE | YIELD | EXT-RACT'N | IN-SERT'N | IN/OUT |
|---|---|---|---|---|---|
| P1/1 | Main | 100/0/0 | N/A | N/A | 1X/1X |
| P2/2 | Main | 100/0/0 | N/A | N/A | 1X/1X |
| OP1/1 | Option | 100/0/0 | P1 Out | P2 In | 0.5X/0.5X |
| OP2/1 | Option | 100/0/0 | P1 Out | P2 In | 0.5X/0.5X |
| EOL | N/A | N/A | N/A | N/A | 1X |

FIG. 7C is a block diagram showing an example of a main process path comprising processes P1–P5, one option path including process OP1, one feeder path including process FP1 and FP2, and a rework process path originating from feeder path process FP2 and including process RP1. The derivative method for calculating $Dc_{ij}$ for the manufacturing process line configuration of FIG. 7C includes:

1) considering an amount of product x inputted into process P1;
2) calculating the amount of product that is outputted by process P1, which in this example is x because the yield of process P1 is 100%;
3) determining the amount of product that is inputted into process P2, which in this example is 0.8x because the parameter list of optional process OP1 shows that 20% of the output of process P1 is directed into option path process OP1;

4) calculating the amount of product outputted from process P2, which in this example is 0.8x because the yield of process P2 is 100%;

5) determining the amount of product inputted to process P3, which in this example is 0.8x;

6) calculating the amount of product that is outputted by process P3, which in this case is 0.6x because the yield of process P3 is 75% with 25% of the product going to scrap;

7) determining the amount of product inputted to option path process OP1, which in this example is 0.2x because the parameter list for optional process OP1 shows that 20% of the product outputted by process P1 is diverted into optional process OP1;

8) calculating the amount of product that is outputted by optional process OP1, which in this case is 0.18x because optional process OP1 has a yield of 90% with 10% being directed towards scrap;

9) determining the amount of product inputted to process P4, which is the sum of the outputs of processes P3 and OP1 and, in this example, is 0.78x.

10) calculating the amount of product that is output by process P4, which in this example is 0.78x because process P4 has a yield of 100%;

11) determining the amount of product inputted to process P5, which in this example is 0.78x;

12) determining the amount of product outputted to EOL, which in this example is 0.468x because the yield of process P5 is 60% with 40% going to scrap;

13) calculating a multiplier x by normalizing the amount of product outputted to the EOL to the value 1, which in this case is 1/0.468=2.14;

14) considering an amount of component (a component being the product produced in a feeder path) y inputted to the beginning of the feeder path that includes feeder process FP1 and FP2 and rework path RP1;

15) determining the amount of component that is inputted into feeder process FP1, which in this case is y+z where z is the amount of component that is outputted by rework process RP1;

16) calculating the amount of component that is outputted by feeder process FP1, which in this case is 0.75(y+z) because feeder FP1 has a yield of 75% with 25% going to scrap;

17) determining the amount of component that is inputted to feeder process FP2, which in this case is 0.75(y+z);

18) calculating the amount of component that is outputted from process FP2, which in this case is 0.675(y+z) because process FP2 has a yield of 90% with 10% of the product being routed to the rework process;

19) determining the amount of component inputted to rework process RP1, which is 0.075(y+z);

20) calculating the amount of component that is outputted by rework process RP1, which in this example is 0.075(y+z) because the yield of process RP1 is 100%;

21) determining a value for z using that, from step 15, z represents the output from rework process RP1, z=0.075(y+z) therefore z=0.075y/(1−0.075)=0.081y;

22 determining the total amount of component outputted from the feeder process, which from steps 18 and 21 is 0.675(y+z)=0.730y; and 23) determining y by balancing the amount of components outputted by the feeder path with the amount of product required in the product path to which the feeder path outputs (i.e., if the feeder path must supply 4 components for each unit of finished goods at the EOL, then y is calculated such that 4 components are produced for each unit of product in the main path at the insertion path), which in this example (with a 1:1 correspondence assumed) is 0.78x=0.73y (see steps 9, 13 and 22) or y=1.07x=2.29.

Table IV shows the input parametric values and the calculated values of x for the manufacturing line of FIG. 7C, including the extraction and insertion points of the feeder path, and the insertion point of the feeder path. From the above calculation, x in this example is 2.78.

TABLE IV

| PROCESS/ID | PATH | YIELD | EXT-RACT'N | IN-SERT'N | IN/OUT |
|---|---|---|---|---|---|
| P1/1 | Main | 100/0/0 | N/A | N/A | x/x |
| P2/2 | Main | 100/0/0 | N/A | N/A | .8x/.8x |
| P3/3 | Main | 75/0/25 | N/A | N/A | .8x/.6x |
| P4/4 | Main | 100/0/0 | N/A | N/A | .78x/.78x |
| P5/5 | Main | 60/0/40 | N/A | N/A | .78x/.468x |
| OP1/1 | Option | 90/0/10 | P1 Out | P4 In | .2x/.18x |
| FP1/1 | Feeder | 75/0/25 | N/A | N/A | 1.16x/.87x |
| FP2/2 | Feeder | 90/10/0 | N/A | P4 In | .87x/.78x |
| RP1/1 | Rework | 100/0/0 | FP2 Out | FP2 Out | .078x/.078x |
| EOL | N/A | N/A | N/A | N/A | 1X |

From the above three examples, one skilled in the art can readily determine a procedure for determining the demand at each process j for each product i. Examples of calculations involving option paths, rework paths, and feeder paths were given.

After the demand-at-capacity for product i at process j is calculated in step 87 of FIG. 5, the actual cycle time (also known as the actual process time) for each product at each process is obtained in step 88. The actual cycle time for each process is either calculated or, alternatively, retrieved from memory as calculated at step 75 of FIG. 4. As previously described, the actual cycle time for a process is the sum of the previously defined non-overlapping work-content times (either machine or labor associated with the tasks comprising the SOEs at each process.

The demand-at-capacity for product i at process j, $Dc_{ij}$, and the actual cycle time for product i at process j, $AT_{ij}$, are calculated for all of the products in the product family for a given process j. Query step 90 checks to determine if all products in the product family utilizing process j have been analyzed. If not, then the product index i is incremented by one at step 89 and $Dc_{ij}$ and $AT_{ij}$ are calculated for the next product.

If no additional products in the product family for that process remain, the total demand at that process, $Dc_j$, is then calculated at step 91. The total demand at process j is calculated by summing $Dc_{ij}$ across all products in the product family at process j, i.e., $Dc_j = \Sigma_j Dc_{ij}$.

The operational cycle time, also known as the takt time, for all products at process j is then calculated in step 92 by the following equation:

$$OPc/t_j = [H_j * S_j]/(\Sigma_i Dc_{ij}), \quad (1)$$

where:
- i ranges from 1 to the total number of products in the product family at process j;
- j is the process identifier (process ID) and ranges from 1 to the total number of processes in the production path;
- $H_j$ is the number of work hours per shift for process j;
- $S_j$ is the number shifts per day in process j; and
- $Dc_{ij}$ is the demand at capacity of unit/sub-assembly/component associated with model i at process j.

For each process, the number of hours per shift and the number of shifts per day are defined in steps 84 and 85 of FIG. 5. The EOL demand-at-capacity for product i is obtained in step 83. The demand-at-capacity for product i at process j is obtained in step 87.

A demand weighted average actual cycle time for all products at process j, $ATw_j$, is calculated at step 93. The demand weighted average cycle time considers the average time to produce products and is given by $$ATw_j = [\Sigma(Dc_{ij} * AT_{ij})]/\Sigma Dc_{ij}, \quad (2)$$

where $AT_{ij}$ is the actual cycle time (or process time) for product i at process j obtained in step 83 of FIG. 4.

When these parameters are calculated for each product i and process j, the system proceeds through off-page connector 96, to balance resources 200 (see FIG. 2).

Table V shows takt time and the demand-at-capacity for a single product having a total EOL demand-at-capacity of 100 units in the manufacturing line shown in FIG. 7A. The values shown in Table V are based on processes where $H_j$ and $S_j$ are set to 7.3 hrs. and 1, respectively.

TABLE V

| PROCESS/ID | PATH | TAKT TIME (min) | DESIGNED OUTPUT | ORIGINAL THROUGH-PUT | SCRAP |
|---|---|---|---|---|---|
| P1/1 | Main | 4.16 | 105.263 | 105.263 | 0 |
| P2/2 | Main | 3.96 | 100 | 110.53 | 5.263 |
| P3/3 | Main | 4.38 | 100 | 100 | 0 |
| RP1/1 | Rework | 83.22 | 5.263 | 5.263 | 0 |

In Table V, designed output refers to the actual amount of product that is outputted from the process and original throughput refers to the actual amount of product inputted to the process. Values for the designed output and the original throughput are obtained from Table II. The takt time is calculated using the Original Throughput value. For example, the takt time for process P2 given by (7.3 hrs)/110.53=3.96 minutes (see Equation 1). Notably, the takt time for process 2 is lower than the other processes in the example because the lower yield associated with process P2 requires a higher throughput rate.

Table VI shows the takt times and flows for a single product in the manufacturing line shown in FIG. 7B. In accordance with Table III, in order to obtain one unit of product at EOL, one unit of product must be inputted to process P1. Again a 7.3 hour work shift (H=7.3), one work shift per day (S=1) for each process, and an EOL demand-at-capacity of 100 units is assumed.

The takt time is calculated using the Original Throughput value. Notably, the takt times for processes OP1 and OP2 are longer because of the smaller demand associated with each option process which requires a lower throughput rate.

TABLE VI

| PROCESS/ID | PATH | TAKT TIME (min) | DESIGNED OUTPUT | ORIGINAL THROUGH-PUT | SCRAP |
|---|---|---|---|---|---|
| P1/1 | Main | 4.38 | 100 | 100 | 0 |
| P2/2 | Main | 4.38 | 100 | 100 | 0 |
| OP1/1 | Option | 8.76 | 50 | 50 | 0 |
| OP2/1 | Option | 8.76 | 50 | 50 | 0 |

Table VII shows the takt times for a single product manufactured by the manufacturing line illustrated in FIG. 7C. Again, a demand-at-capacity for the product is 100 units, $H_j$=7.3 hrs and $S_j$=1 are considered.

TABLE VII

| PROCESS/ID | PATH | TAKT TIME (min) | DESIGNED OUTPUT | ORIGINAL THROUGH-PUT | SCRAP |
|---|---|---|---|---|---|
| P1/1 | Main | 4.38 | 214 | 214 | 0 |
| P2/2 | Main | 5.48 | 171.2 | 171.2 | 0 |
| P3/3 | Main | 5.48 | 128.4 | 171.2 | 42.8 |
| P4/4 | Main | 4.38 | 166.92 | 166.92 | 0 |
| OP1/? | Option | | 38.52 | 42.8 | |
| P5/5 | Main | 4.38 | 100 | 166.92 | 66.92 |
| FP1/1 | Feeder | 8.76 | 186.18 | 248.24 | 62.060 |
| FP2/2 | Feeder | 8.76 | 166.92 | 186.18 | 0 |
| RP1 | Rework | 43.8 | 16.7 | 16.7 | |

3. Balancing Resources 200

The operational cycle time $Opc/t_j$ (takt time) at a process is calculated by dividing the process time by the summed demand at capacity of each product at each process $Dc_{ij}$ (Equation 1) and defines the maximum cycle time that can be allowed to produce a product in that process in order that the demand-at-capacity at the end-of-line is provided. Balance resources 200 adjusts the capabilities of each process (i.e., by allocating resources to the process) in order that the operational cycle time (takt time) target is met, thereby synchronizing or balancing the flow of product through all processes.

The computerized mixed-model manufacturing design system 1 (see FIG. 1) calculates the number of resources required at each process to manufacture the set of products. In some embodiments, the term "resources" refers to individual machines or quantities of labor required for a process, i.e., operations, machines, pieces or people required to support the manufacture of products in each process. In the present exemplary embodiment, the resources at each process are analyzed and adjusted, if necessary, to balance the demand weighted average cycle time $AwT_j$ with the takttime $OPc/t_j$ at each process j. This resource balancing ensures smooth product flow between adjacent processes. Other embodiments of this invention may balance the resources after the definition process cells have been created and operations within those cells defined.

Figure 6:
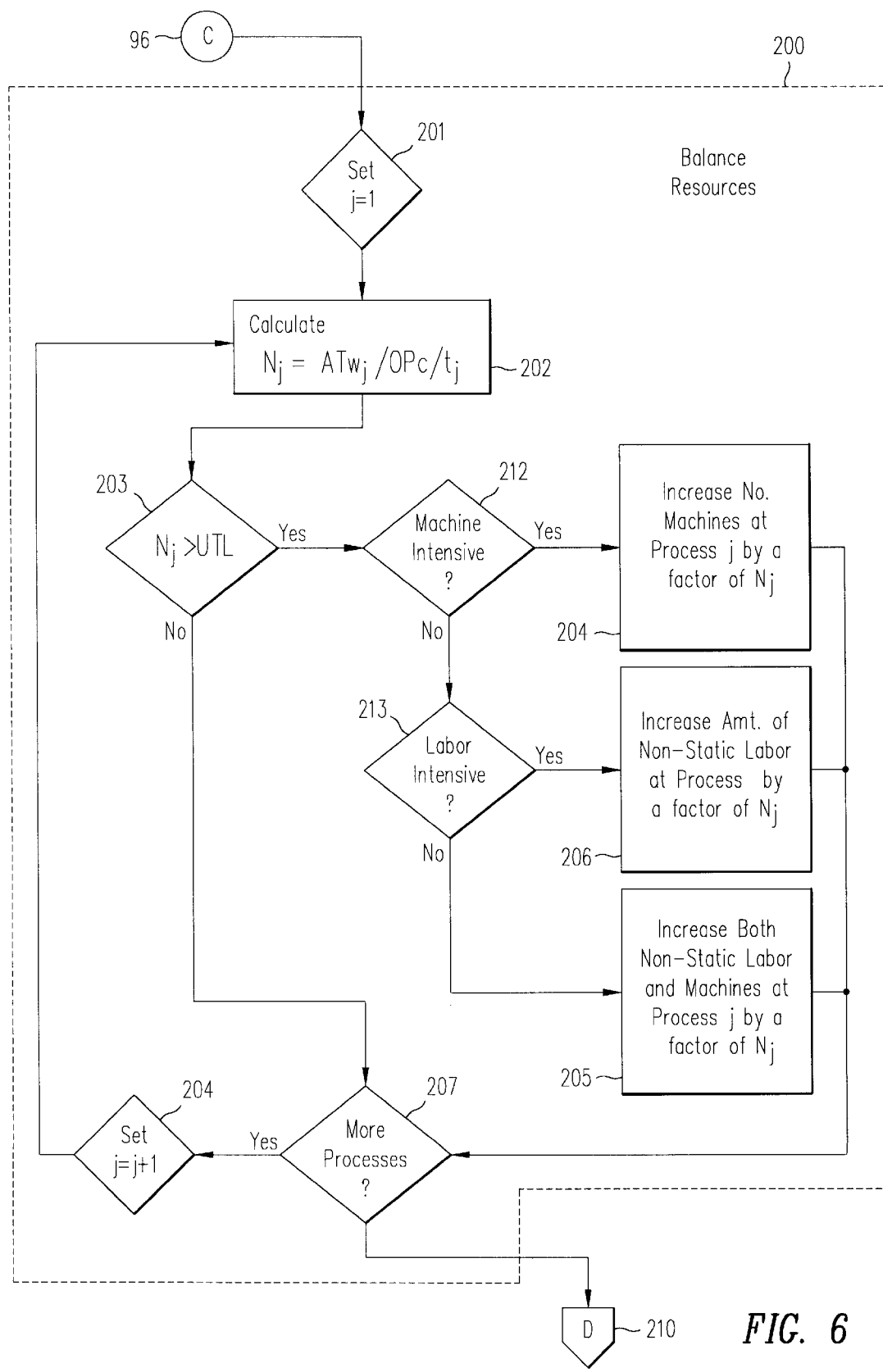
FIG. 6 is a detailed flow diagram of the resources balancing step according to the present invention as shown in FIG. 2.

FIG. 6 shows a resource balancing 200 method for balancing resources according to the present invention. Off-page connector 96 indicates the continuation of the method according to the present invention into the resource balancing step 200. After process index j is initialized to 1, i.e., pointing to the first process, at step 201, the resource multiplier, $N_j$, for process j is calculated in step 202. The resource multiplier is given by $$N_j = ATw_j/(OPc/t_j) \quad (3)$$

where:

OPc/$t_j$ is the operational cycle time (or takt time) at process j (see equation 1); and ATw$_j$ is a demand weighted average cycle time at process j (see equation 2).

The resources multiplier is the ratio of the weighted average cycle time, ATw$_j$=[$\Sigma$j (Dc$_{ij}$*AT$_{ij}$)]/$\Sigma$j Dc$_{ij}$, to the operational cycle time OPc/$t_j$. The weighted average cycle time ATw$_j$ is calculated in step 93 of FIG. 5 and the takt time OPc/$t_j$ is calculated in step 92 of FIG. 5. In other embodiments of this invention, N$_j$ may be calculated in other ways, including substituting an un-weighted cycle time average, a medium cycle time value, a root mean square (RMS), demand-at-capacity estimate, and the like, for the takt time.

The actual cycle times for each product at a process will be dependent on the work performed on that product model. Consequently, the demand weighted average cycle time at a process may deviate significantly from the takt time. Alternatively, adjusting the amount of resources required may occur at either the process level, prior to grouping processes into cells, or at the cell level. A resource multiplier is used to scale the amount of resources required in order that the takt time (OPc/$t_j$) be nearly the demand weighted average cycle time (ATw$_j$).

Also, parameters other than ATw$_j$ or Dc$_j$ may be used to calculate a resource multiplier N$_j$ with comparable results. Other parameters on which a calculation of a resource multiplier can be based include an un-weighted actual cycle time average, a median actual cycle time value, a root mean square (RMS) actual demand estimate, and the like.

If at step 203 N$_j$ is determined to be greater than an upper threshold, UTL, then additional resources must be provided in an amount equal to the original resource amount multiplied by the resource multiplier N$_j$ minus the original resource amount. Typically, UTL is one. However, UTL may be slightly higher than one, for example 1.1 or 1.2, without significantly affecting the flow or product through the process. If N$_j$ is significantly less than 1 (e.g., 0.8 or 0.9), then the process has more resources available than are required to meet the demand-at-capacity. For purposes of balancing resources, concern is with the case when N$_j$ is greater than the threshold indicating that the amount of resources available is unacceptably less than the amount required to meet the demand-at-capacity for that process. When N$_j$=1, there are just enough resources to meet the demand-at-capacity.

Where the resources are determined in step 212 to be grouped principally by process equipment, or machines, the original number of machines is multiplied against N$_j$ as shown in step 204. Where resources are determined at step 213 to be defined primarily in terms of labor, the original non-static labor amount is multiplied by N$_j$ in step 206. If resources are neither machine nor labor intensive, then both machine and labor resources are multiplied by N$_j$ in step 205 to provide the required amount of resources sufficient to satisfy the demand-at-capacity at process j.

When calculating machine resources in some embodiments, the total number of machines required is rounded to the next whole number. Also, since both the total number of machines and the demand-at-capacity at that process are known, the throughput of each machine is easily calculated.

The deviation of the demand weighted average cycle time from the takt time may also be compensated for by improving the process, such as reducing non-productive work time ("non-value add" tasks such as set-up and move times) or by reducing actual machine time or labor time. Alternately, the takt time at a process may be modified by increasing the number of hours worked per day (i.e., increasing H, S or both) or by increasing the yield through process improvements or through rework, thereby reducing the demand-at-capacity at that process.

Alternately, resources may be balanced after processes common to a product family have been grouped into a cell. In that case, the work times for each of the dissimilar machines and/or for each person performing dissimilar tasks is compared to the takt time as defined in Equation 1. The number of machines or persons is adjusted so that the cumulative work time for each set of dissimilar machines or persons is within a predetermined range of the takt time for the cell. The cell takt time is calculated as in Equation 1, with the exception that the demand at capacity is calculated for the cell rather than for a process.

In some embodiments, multiplier N$_j$ is also interpreted as a machine utilization index. If N$_j$ is approximately equal to one, then machine utilization is high. If N$_j$ is less than about 0.8, then machine utilization is low. Accordingly, the index, N$_j$, permits resource planning and monitoring after the manufacturing line has been designed and built. Using the mixed-model manufacturing process design system 1 (see FIG. 1) at the start of a routine manufacturing day, the demand weighted average cycle time, ATw$_j$, and the daily demand rate, Dr$_j$, are provided as inputs to permit calculation of a flow rate and a daily resource index N$_j$. The calculations are in accordance with Equation 1 through Equation 3, with the exception that EOL demand-at-capacity, Dc, is replaced with that day's EOL demand rate, Dr. During lower volume production days, when the calculated number of required resources are correspondingly smaller, machine units can be switched off, or taken off-line, in integer increments, thereby bringing the utilization closer to unity.

When resources include primarily labor resources, the calculation provides the number of people (or the number of person hours) required for the process. As in the calculation of the number of machines, the number of people also provides a labor utilization index whereby the amount of labor provided may be reduced in accordance with the daily rate of production.

Query step 207 determines whether there are additional processes to be resource balanced. If there are additional processes, then the process index j is incremented at step 209 and steps 202–207, 212 and 213 are repeated. Otherwise, balance resources 200 terminates at off-page connector 210.

4. Cell Definition 300

In some embodiments of the invention, processes are combined to produce "cells". A cell is defined as a convenient grouping of dissimilar resources (people and/or machines) in a logical and sequential manner in order to facilitate the flow of product or products. The cells of the manufacturing line impart work content at constant volume product flow (i.e. no yield loss in the cell, or yield loss only at the output of the cell). In some embodiments, the selection of processes to include in a cell is at the discretion of the manufacturing line designer using the system. In other embodiments, the processes are selected, at least in part, by the system.

Although flexible, cells are defined in a fashion to facilitate the flow of quantities of product through the manufacturing line. For example, a cell may be defined to include several machine dominated processes along with a single person who operates all of the machines. Definitions of this fashion maximize the utilization of the various resources of the manufacturing line and reduce the amount of scrap produced.

Figure 8A:
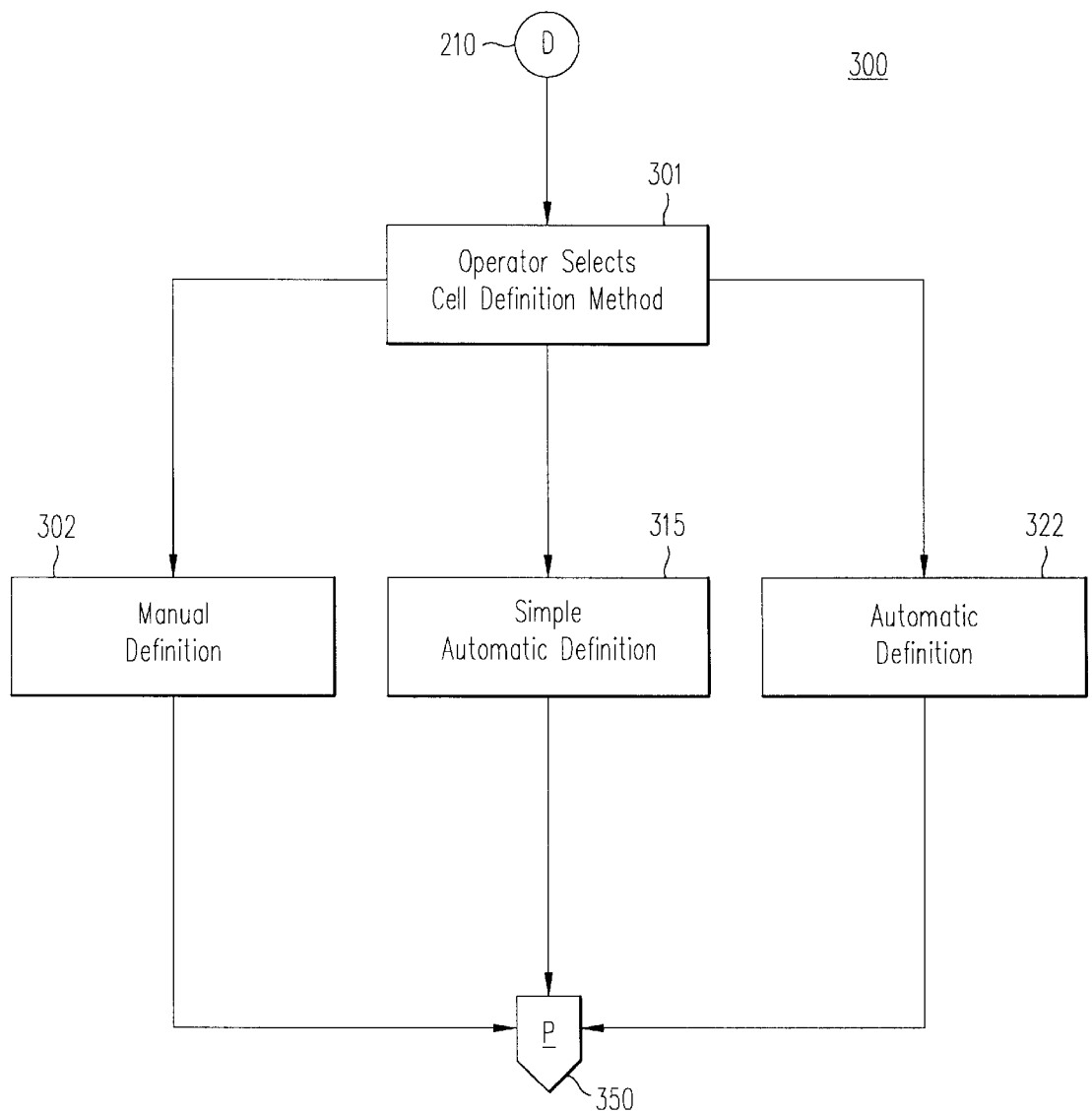
FIGS. 8A–8D shows a detailed flow diagram of one embodiment of the cell definition step of the method and system according to the present invention as shown in FIG. 2.

Referring now to FIG. 8A, the procedure resumes from off-page connector 210 (FIG. 6) with the cell definition step at 300. In some embodiments, the operator of the mixed-model manufacturing design system 1 (FIG. 1) may elect to select the method by which processes are assigned to cells at a step 301. In some embodiments, the operator may choose not to define the cells, in which case each process is defined as its own cell. In the embodiment illustrated in FIG. 8A, the operator may select one of three methods of cell definition: a manual definition 302, a simple definition 315, or an automatic definition 322. Cell definition 300 exits at connector 306.

Figure 8B:
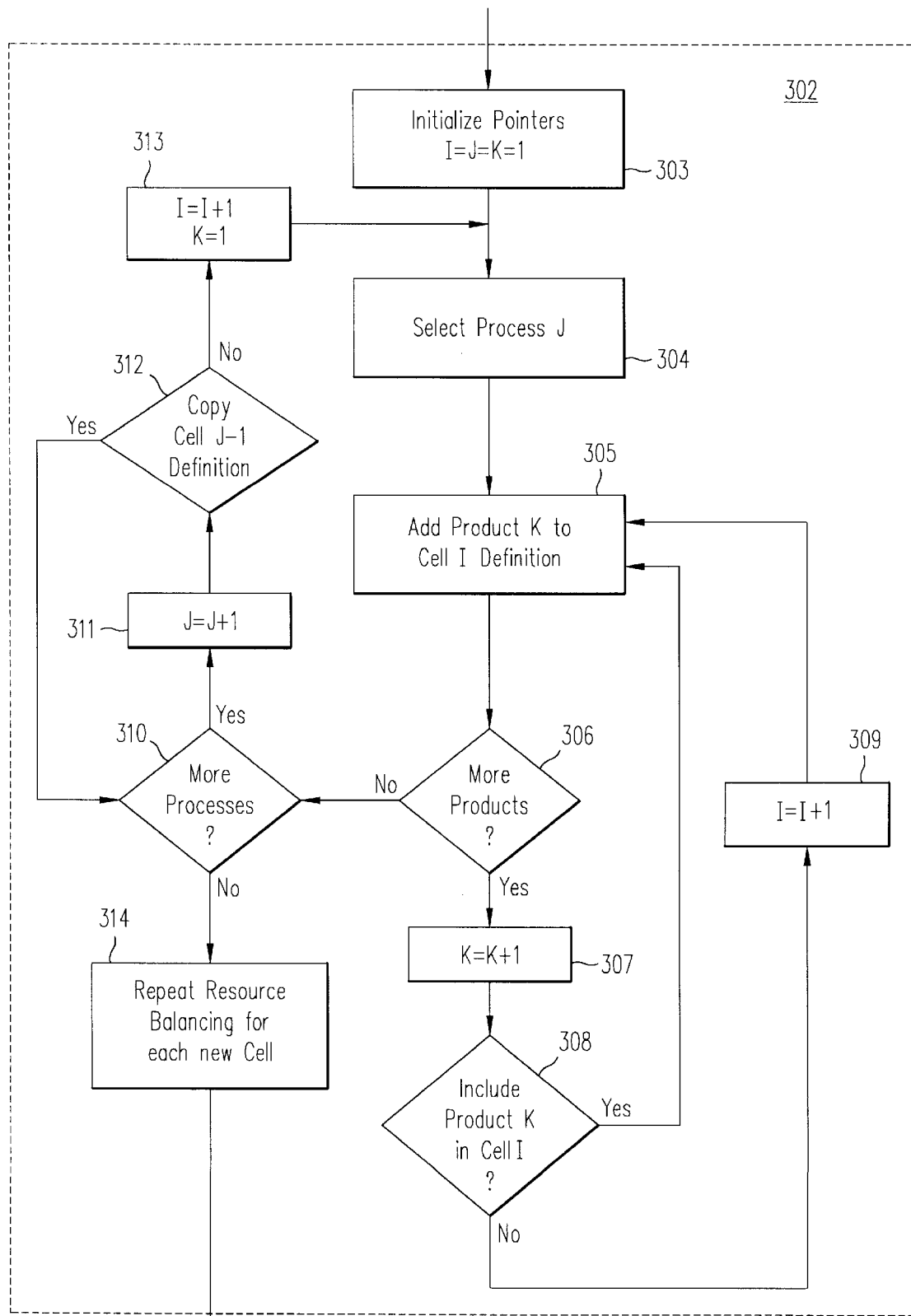

FIG. 8B shows an embodiment of manual definition 302. Initialization step 303 initializes pointers I, J, and K to 1. The pointer I refers to the cell that is currently being defined, pointer J refers to the process that is currently being evaluated, and pointer K refers to the product in the family of products that includes process J. A process is selected in select process 304. In step 305, product K is added to the definition of cell I. Adding product K to cell I indicates that process J for producing product K is included in cell I. Initially, the first product (K=1) of the family of products that includes process J is added to cell I.

Decision step 306 determines if there are further products in the family of products that includes process J. If there are, K is incremented in step 307. In step 308, the operator is queried as to whether to include product K in cell I. If not, then the cell pointer I is incremented in step 309 and product K is included in the new cell I at step 305. If, at step 308, the operator elects to include product K in the current cell I, then product K is added to cell I at step 305.

If, in step 306, it is determined that there are no further products in the family of products that includes process J, then step 310 determines if there are further processes to analyze. If there are further processes, the process counter is incremented in step 311. In step 312, the operator is queried as to whether or not to copy the cell definitions for the J−1 process into the definitions for the Jth processes. If the operator elects to copy the processes from the J−1th process, then step 310 again determines whether there are further processes. In some embodiments, the operator may copy any previously determined set of cell definitions for a process.

If, in step 312, the operator elects not to copy a previous cell definition, then the cell pointer I is incremented and the product pointer K is set to 1 in step 313. After step 313, manual definition 302 returns to step 304.

If, at step 310, it is determined that there are no further processes to consider, step 314 repeats the steps that lead to resource balancing before exiting manual definitions 302. At this point, steps 64 through 210 of FIGS. 4 through 6 are repeated except that the definitions referring to processes now refer to cells.

Figure 8C:
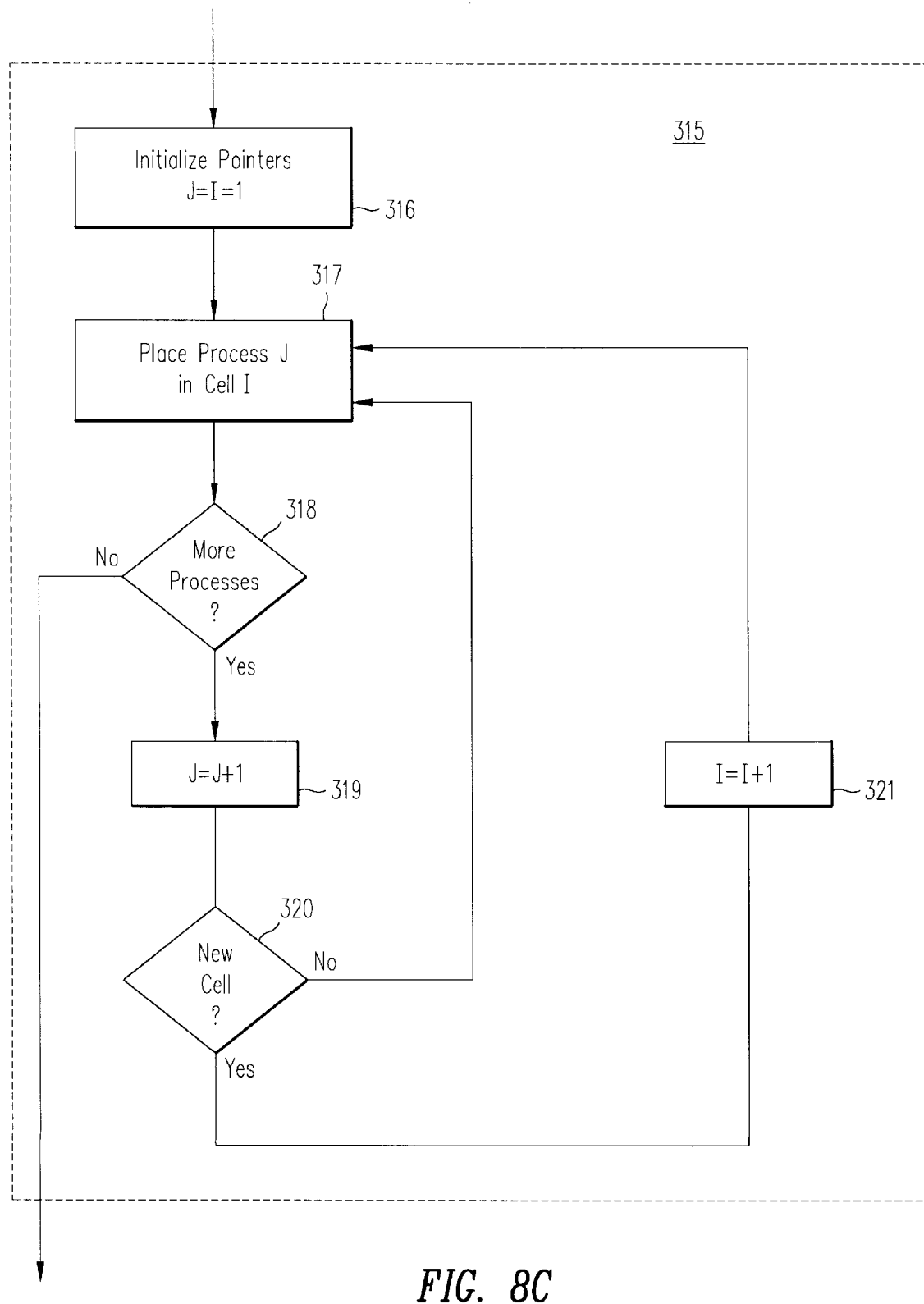

FIG. 8C shows a simple cell assignment 315. Cell counter I and process counter J are initialized at step 316 and set equal to one. The first process is assigned to the first cell at step 317. The system then identifies any additional processes at step 318 and increments J at step 319. In step 320, the operator indicates whether or not to begin a new cell. If the operator opts not to begin a new cell, simple definition 315 returns to step 317 and process J is added to cell I.

Not all processes may appropriately be included in a multi-process cell. For example, the proximity to other processes, and/or the character of the sequential process (e.g., clean room versus non-clean-room, or use of hazardous or incompatible chemical raw materials), or non-constant volume flow may compel isolating a process as a single-process cell.

If, in step 320, the operator elects to begin a new cell, cell pointer I is incremented in step 321 and process J is added to cell I in step 317. The foregoing steps are repeated until all processes have been assigned to a cell. In some embodiments of the design system, the operator may opt a default to assign each process to a single cell.

In still other embodiments of the system of the present invention, processes may be automatically assembled into cells at step 322 (FIG. 8A). While not shown in FIG. 8A, various criteria may be programmed into the system to determine whether processes may be combined. For example, sequential processes may include a flag in their process definitions indicating that the sequential set of processes are combinable in a single cell. Alternately, process characteristics such as proximity to an adjacent process, whether or not an operator or technician will be shared with an adjacent process, the absence or presence of hazardous chemicals, and the like may be considered by an artificial intelligence module in the system to determine whether adjacent processes are appropriately combinable into a single cell.

Figures 1, 8D:
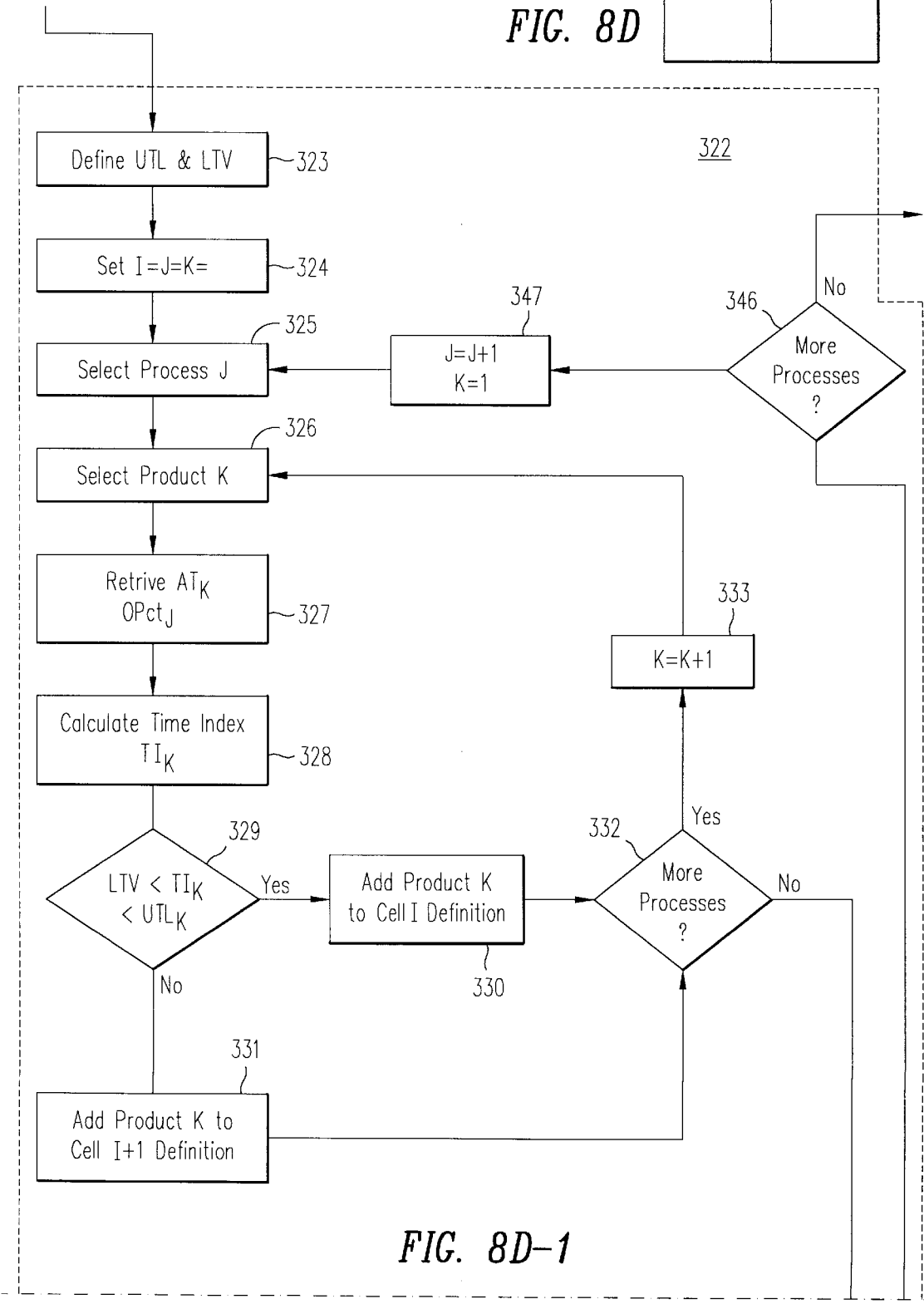
Figures 2, 8D:
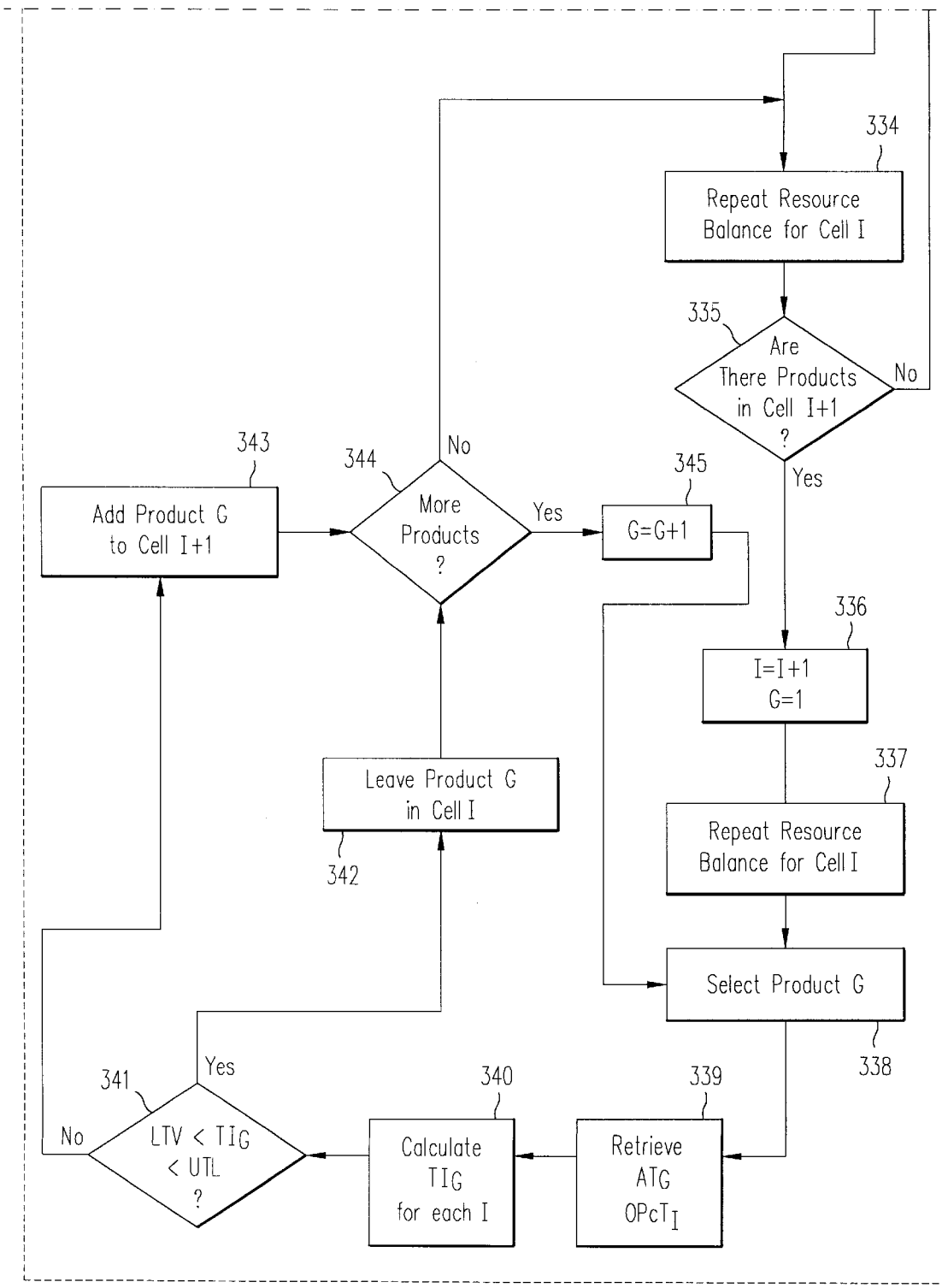

FIG. 8D shows an embodiment of automatic cell definition 322. The embodiment of automatic cell definition 322 shown in FIG. 8D is based on product balancing. The takt time for a process is based on a demand weighted average cycle time across all products comprising the family of products at that process. It is possible that the actual cycle time for an individual product model may deviate significantly from the takt time. Those product models having significantly different actual cycle times from the demand weighted average cycle time will cause temporary disruptions in the product flow through that process.

Accordingly, these product models are identified in a product balancing step by comparing the "time index" of product i in cell (or process) l, with the takt time for cell (or process) l. The time index is defined as follows:

$$TI_{il} = AT_{il}/(OPc/t_l) \qquad (4)$$

where $TI_{il}$ is the time index of product i in process l, $AT_{il}$ is the actual cycle time of product i in process l, and $OPc/t_l$ is the operational cycle time or takt time of cell l. The takt time for cell l, $OPc/t_l$, is equal to the takt time of the processes comprising that cell. It is clear that a $TI_{il}$ value of 1.0 is desirable as the actual cycle time for the product is equal to the takt time of the cell, thereby ensuring smooth product flow at that cell. Products having a time index which deviate significantly from 1.0 are identified and alternate operations, cells or option paths can be provided to accommodate them.

The embodiment of automatic cell definition 322 shown in FIG. 8D, which is based on product balancing, begins with a definition of the threshold limits that bound the time index at step 323. A lower threshold value (LTV), typically 0.8, and an upper threshold limit (UTL), typically 1.1, are defined to the system at step 323 by the manufacturing line designer (the operator). These threshold values place limits on how much deviation the actual process time at each operation varies from the operational cycle time for the cell and depend on the takt time $OPc/t_j$; for the process. Long operational cycle times can tolerate more deviation in actual process time from the takt time. For example, for takt times less than 3.0 minutes, the limits may span the range of 0.9 to 1.1. If the takt time is in the range of 3 to 9 minutes, then the limits may span the range 0.8 and 1.1. If the takt time is greater than 9, but less than 30 minutes, then the limits may span the range 0.7 and 1.2. If the takt time is greater than 30 minutes, then the limits may be in the range between 0.7 and 1.3. Additionally, the operator may initially set the threshold limits high when initially defining cells and refining the limits at a later stage of cell definition.

Initialization 324 sets cell counter I, product counter K, and process counter J to one. Process J is selected for consideration in step 325 and product K is selected for consideration in step 326. Product K is a member of the family-of-products that includes process J In step 327, the actual cycle time for product K at process J, $AT_{KJ}$ and the operational cycle time (takt time) time for process J $OPc/t_J$ are retrieved. The time index for product K, $TI_K$, according to Equation 4 is calculated in step 328 and compared against the upper threshold limit and lower threshold value in step 329. If $TI_K$ falls within the LTV to UTL limits, then product K is added to the definition of cell I (i.e., process J for product K is added to the cell definition) in step 330. If $TI_K$ falls outside of the LTV to UTL limits, product K is added to the cell definition of cell I+1.

Step 332 determines if there are more products in the family of products for process J. If there are more products, the product pointer K is incremented in step 333 and product K is selected for consideration in step 326. If step 332 determines that there are no more products, then step 334 re-executes a resource balancing for cell I. Step 334 executes steps 64 through 210 of FIGS. 4 through 6 in order to balance the resources in cell I.

Step 335 determines if there are any products that were placed in cell I+1. If cell I+1 is empty, step 346 determines if there are more processes to consider. If not, then automatic cell definition 322 exits. If step 346 determines that there are more processes, then product pointer K is reset to 1, process pointer J is incremented and a new process is selected for consideration in step 325.

If it is determined in step 335 that cell I+1 is not empty, then cell pointer I is incremented by 1 and a product counter G is set to 1 in step 336. The resource balance procedure for cell I (steps 64 through 210 of FIGS. 4 through 6) are executed in step 337. Product G is selected in step 338 and the actual cycle time ATG and the operational cycle time $OPc/t_J$ for product G and cell I, respectively, are retrieved in step 339. The time index for product G in cell I, $TI_G$, is calculated in step 340 and compared with the lower threshold value and the upper threshold limit in step 341. If time index $TI_G$ is within the limits of LTV and UTL, then product G is left in Cell I in step 342. However, if time index $TI_G$ is not within the limits of LTV and UTL, then product G is added to cell I+1 in step 343. Step 344 determines if there are more products to consider in cell I. If there are more products to consider, the product counter G is incremented in step 345 and product G is selected in step 338. If there are no more products in cell I to consider, then step 334 rebalances the resources for cell I.

Once cells have been defined, the system exits cell definition at connector 306 and enters the operational definition 400 (FIG. 2) step.

5. Operational Definition 400

The system enters the operational definition step 400 at off-page connector 306 (FIG. 8A). An operation is a subset of a cell and is defined as a grouping of tasks taken from the SOEs (see step 51 of FIG. 3) that define the work to be performed on the products by a person or machine. Operations are conveniently defined in relation to particular types of machine, or to a labor operation. In an anticipated high-volume, machine intensive manufacturing line, operations are advantageously identified with the work content associated with a machine type. For example, in a high volume computer disk manufacturing process, a cell may comprise a surface etch process and a nickel phosphate plating process. It would be convenient to divide the cell into two operations, i.e., a surface etch operation and a plating operation. Typically, as in the case of the foregoing example, the operations are divided along process boundaries although that is not always the case. Alternately, in a low volume labor intensive manufacturing line, it is convenient to divide operations around labor boundaries.

The grouping of tasks to produce an operation is constrained by the requirement that each group of tasks, based on their cumulative previously defined work content times, have an actual cycle time that is approximately equal to the takt time, or operational cycle time, for the processes corresponding to the tasks in the group. If the resource balancing was performed at the process level, as described above, and if operational boundaries within the cell correspond to the process boundaries, then the cycle times of each operation will, in fact, be approximately equal to the takt time of the constituent processes.

Figure 9:
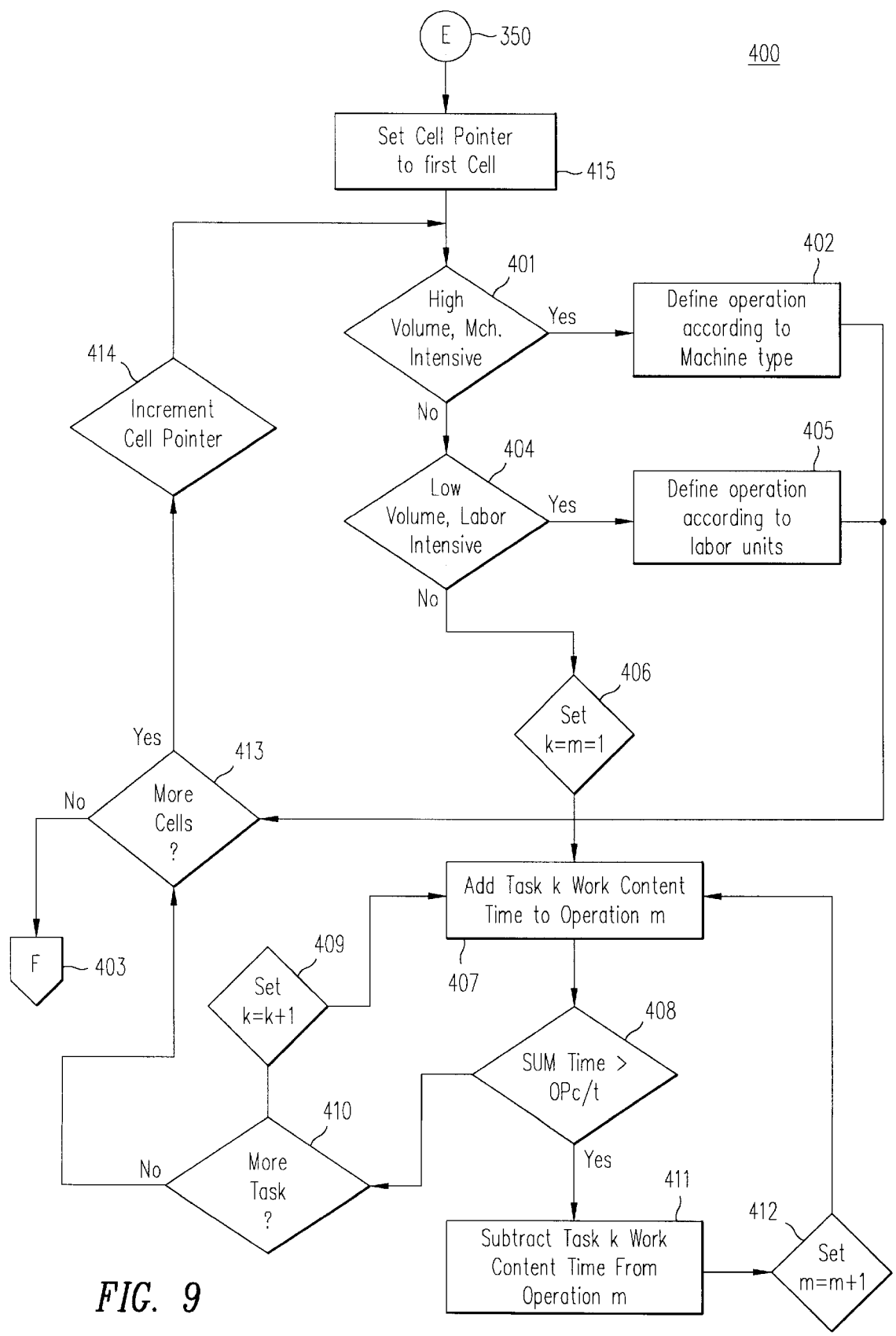
FIG. 9 shows a detailed flow diagram of one embodiment of the operational definition steps of the method and system according to the present invention as shown in FIG. 2.

FIG. 9 shows an embodiment of the define operation step 400 (see FIG. 2). A cell pointer is initialized to point at cell one in step 415. If it is indicated to the system at step 401 that the intended process is a high-volume, machine-intensive process, then operations are defined according to machine work content (in step 402). If, on the other hand, it is indicated at step 404 to the system that the anticipated manufacturing line is a low-volume, labor intensive line, the operations are defined around labor content times, as at step 405. After either of steps 402 or 405, the system proceeds to step 413 and, if there are remaining cells returns to step 401.

Defining operations according to machine type allows tasks that are machine intensive to be grouped. For example, if the work content for the tasks is primarily from machines and labor work content is minimal, then operations defined by machine tasks are desired. Contrarily, if the work content is dominated by labor then grouping by labor tasks is desired.

Alternately, when the anticipated process is neither machine nor labor intensive or where divisions according to process boundaries are not logical, and particularly where the individual processes have not been previously resource balanced, the system moves on to initialization step 406. In some embodiments steps 401, 402, 404 and 405 may be omitted and the system immediately proceeds to initialization step 406. Initialization step 406 sets task counter k and operation counter m both to one. A first task is included in a first operation in the cell at step 407. The cumulative cycle time of the task is compared to the corresponding process takt time to ensure that the cumulative process time of the first operation does not exceed the takt time for the task's corresponding process. If the takt time is not exceeded, and if additional tasks remain to be allocated as determined at step 410, then the task counter k is incremented by one at step 409 and the next task is included in the first operation. If, at step 408, the takt time is exceeded by addition of the last task (or, alternately, exceeded by a predetermined amount or percentage), then the last task added to the operation is removed from that operation at step 411. The operation counter is then incremented by one at step 412 and the previously removed task is included in the next operation of the cell. Tasks are added to each operation, subject to the constraint that the cycle time for that operation does not exceed the takt time, until all of the tasks for all processes comprising that cell have been allocated to an operation. The last operation may contain tasks whose combined work content time is significantly shorter than the process takt time.

If no more tasks are to be allocated, as determined in step 410, then the system checks whether there are more cells to process in step 413. If there are more cells, step 414 adjusts the cell pointer to the next cell and the system returns to step 401. Otherwise, the operation definition step 400 exits at page connector 403.

If a cell is comprised of a single process, or several constant volume processes, and if operational boundaries in the cell are defined along the process boundaries of the processes comprising the cell, then the resource balancing step (see FIG. 6) will ensure that the operational cycle time of each operation within the cell is approximately equal to the takt time of the processes comprising that cell. If the processes comprising the cells were not previously resource balanced, then each operation must now be balanced against the takt time for processes within the cell. The cell takt time is equal to the takt time of any process in the cell.

Operations, according to this method, are constructed until all tasks have been assigned. In some embodiments, a cell will comprise a single process involving only a single machine type or single person. In that event, the cell will typically comprise a single operation containing the task associated with that process, as defined by the SOE list for that process. Where the resources have been previously balanced for that process, the operational cycle time will be within predefined tolerance limits. If the resources in that process are not yet balanced, then the number of resources (machines and/or persons) are now balanced such that the demand weighted average cycle time of operations (calculated in the same fashion as was previously described for the demand weighted average cycle time for processes) is approximately equal to the takt time.

In other embodiments, multiple dissimilar machine types or multiple persons, each performing a different task, are involved, and the cell will be divided into a plurality of operations, each operation reflecting a single machine type or person. As in the single operation cell, multiple-operation cells are resource balanced either prior to defining the operations (i.e. the individual processes are resource balanced) or else after the operations have been defined so that the demand weighted average cycle time for each operation is within a predefined range around the takt time for the cell.

In view of the above discussion, it is clear that the inter-operational movement of quantities of product within the cell is an essentially continuous flow of the mixed-model production, and that the boundaries between operations represent natural demand-pull, or kanban type interfaces where visible inventory controls can be implemented.

Figure 10:
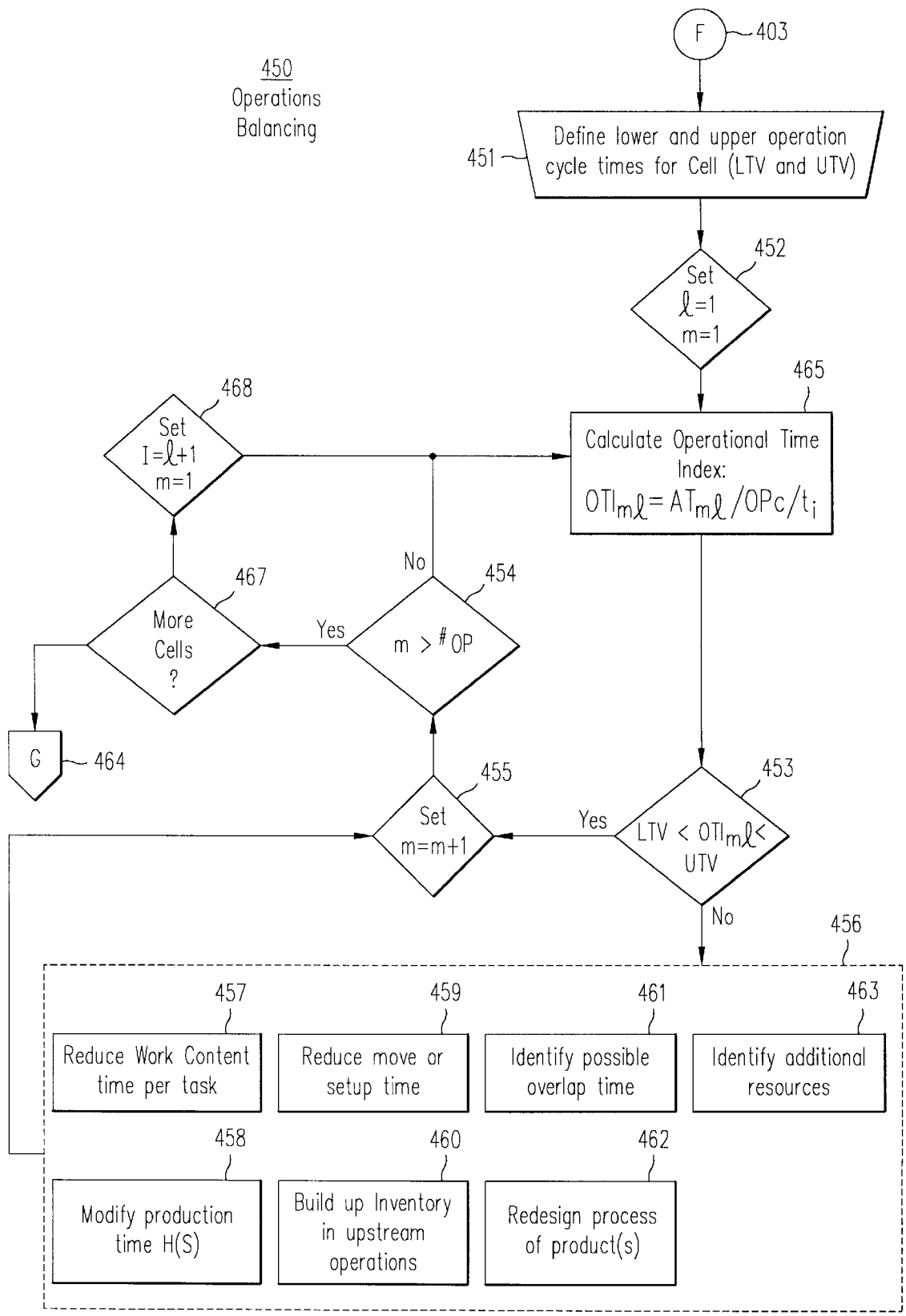
FIG. 10 shows a detailed flow diagram of one embodiment of the operational balancing steps of the method and system according to the present invention as shown in FIG. 2.

Operation definition/balancing continues at connector 403 in FIG. 10. with the operation balancing step 450. A lower threshold value (LTV), typically 0.8, and an upper threshold limit (UTL), typically 1.1, are defined to the system at step 451 by the manufacturing line designer. These threshold values place limits on how much deviation the actual process time at each operation varies from the operational cycle time for the cell and depend on the takt time $OPc/t_j$ for the process. As was previously discussed in relation to automatic cell definition in define cells 300, long operational cycle times can tolerate more deviation in actual process time from the takt time.

Initialization step 452 sets operation counter m and cell counter 1 both to one, thereby pointing to the first operation in the first cell. A time index is calculated at step 465 for the current operation in the current cell according to the following equation:

$$OTI_{ml} = AT_{ml}/OPc/t_l \quad (5)$$

where $OTI_{ml}$ is the time index for operation m in cell l, $AT_{ml}$ is the actual cycle time of operation m in cell l and is equal to the cumulative work content time of the group of tasks comprising that operation, and $OPc/t_l$ is the operational cycle time, or takt time, of cell 1, which relates to the individual takt time of the processes that comprise that cell.

The time index for the operation is compared to the threshold values LTV and UTV in step 453. If the time index for the operation is within the range bounded by LTV and UTV then that operation is considered to be balanced. In that case, the operation counter m is incremented by one in step 455 and the system determines if there are any remaining operations in the cell at step 454. If additional operations remain, then steps 465 and 453–454 are repeated. If no more operations remain in the current cell, the system determines whether any cells are left to be analyzed at step 467, and if so, then cell counter 1 is incremented by one, and the operation counter m is reset to one at step 468 and the system returns to step 465. If no more cells remain, then the operational balancing step of the method of this invention is complete as indicated by off-page connector 464.

If at step 453 the time index is outside of the range bounded by LTV and UTL, then the designer/operator may perform any of a number of mitigating steps, including those identified in block 456. These mitigating actions in step 456 include reducing the work content time per task 457, modifying the production time 458, reducing moves or step times 459, building inventory in upstream operations 460, identifying overlap times 461, redesign processes or products 462, or identify additional resources 463. For example, if the time index exceeds the UTV, then process improvements, or reduction or elimination of move or setup times may be made that will reduce the work content time of the process, thereby reducing the actual cycle time. Overlapping machine times, labor times, or machine/labor times will also reduce the work content time at a process. Additional actions that may be taken to make the actual cycle time approximately equal to the cell takt time include increasing the number of hours worked per day at that operation as at 458, permitting a small inventory build up at upstream operations as at 460, and redesigning the product(s) or process to improve the throughput rate as at 462.

If, in step 467, it is determined that there are no more cells to evaluate, then the results of the manufacturing design is stored and outputted in step 500 (FIG. 2). The mixed-model flow manufacturing design system 1 (FIG. 1) stores the design in storage 6 and outputs the results on monitor 5 or on an attached printer or other hard-copy device or both.

In accordance with yet another aspect of the method of this invention, actual measurements of product flow permit closed-loop design refinements to the designed manufacturing line. Estimates of actual cycle times per product by process, as well as estimates of work content times by product by process, are replaced by actual measurements to better define the resulting takt time, number of resources needed, and to balance each cell.

Some methods according to this invention include daily manufacturing line management. Advantageously, should the daily demand for each product model deviate from the demand at capacity design criteria, the cell and operation definitions do not change. Rather, as demand and product mix fluctuates, the resources required at each cell fluctuates accordingly, thereby permitting the manufacturing line manager to merely use only that portion of the total number of machines or persons in the cell necessary to accommodate the daily demand.

Process 7 is test rework 1107 (rework path);
Process 8 is pack 1108 (main path).

Table VIII shows a product definition as generated in steps 15 through 60 of FIG. 3. Additionally, the system inputs that from process 6 (test 1106), 20% of products 1 through 6 are routed to process 7 (test rework 1107) and 5% of products 7 through 9 are routed to scrap 1110.

TABLE VIII

Definition of Products

| | Proc. 1 Assem. | Proc. 2 Worm shaft | Proc. 3 Cover Assem. | Proc. 4 Drill & Tap | Proc. 5 Deburr | Proc. 6 Test | Proc. 7 Rework | Proc. 8 Pack |
|---|---|---|---|---|---|---|---|---|
| Prod. 1 (2") | X | X | X | X | X | X | X | X |
| Prod. 2 (3") | X | X | X | X | X | X | X | X |
| Prod. 3 (4") | X | X | X | X | X | X | X | X |
| Prod. 4 (6") | X | X | X | X | X | X | X | X |
| Prod. 5 (8") | X | | | X | X | X | X | X |
| Prod. 6 (12") | X | | | X | X | X | X | X |
| Prod. 7 (18") | X | X | | | | X | | X |
| Prod. 8 (24") | X | X | | | | X | | X |
| Prod. 9 (36") | X | X | | | | X | | X |

Illustrative Numerical Example

As a concrete example of a mixed-model manufacturing line design system according to the present invention, consider the manufacture of the nine products listed below:
Product 1 is a 2 inch gearbox;
Product 2 is a 3 inch gearbox;
Product 3 is a 4 inch gearbox;
Product 4 is a 6 inch gearbox;
Product 5 is a 8 inch gearbox;
Product 6 is a 12 inch gearbox;
Product 7 is a 18 inch gearbox;
Product 8 is a 24 inch gearbox; and
Product 9 is a 36 inch gearbox.

Figure 11:
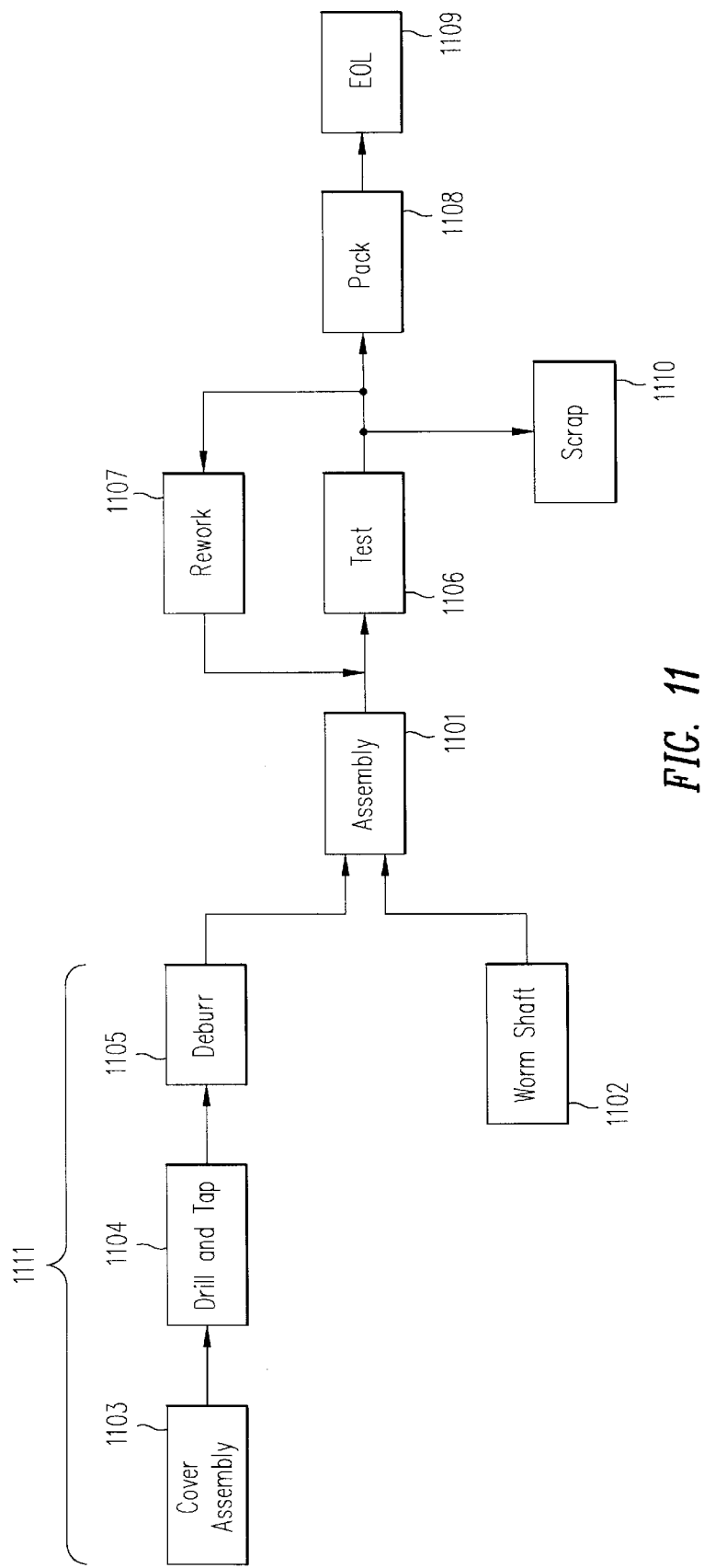
FIG. 11 shows an example manufacturing flow line.

FIG. 11 shows a schematic drawing of a manufacturing line for producing products 1 through 9 listed above. In FIG. 11, two feeder paths feed assembly 1101. Feeder path 1 1111 includes a cover assembly 1103, drill and tap 1104 and deburr 1105 step. Feeder path 2 includes worm shaft 1102. Assembly 1101, test 1106, and pack 1108 comprise a main path terminating at EOL 1109. Test 1106 initiates a scrap 1110 fallout and a rework path that includes rework 1107.

In step 15 of FIG. 3, descriptions of each of the products are entered into design system 1. In steps 16 through 59, each of the products is defined in terms of the following processes:
Process 1 is assembly 1101 (main path);
Process 2 is worm shaft 1102 (feeder path 2);
Process 3 is cover assembly 1103 (feeder path 1);
Process 4 is drill and tap 1104 (feeder path 1);
Process 5 is deburr 1105 (feeder path 1);
Process 6 is test 1106 (main path);

From the definition of products given in Table VIII, families of products are identified in step 63 (FIG. 4). Families of products are defined as groups of products that share at least one process. In the above example, there are several families of products that can be defined. For example, all of products 1 through 8 are included in the family of products that utilize processes 1, 6 and 8. Products 1–4 and 7 through 9 utilize process 2, Products 1–4 utilize process 3, Products 1 through 6 utilize processes 4, 5 and 7. Another grouping of products can be defined utilizing similar processes. Products 1–4 (GB4) utilize processes 1 through 8. Products 5 and 6 (GB8) utilize processes 1 and 4–8. Products 7–9 utilize process 1, 2, 6 and 8. For purposes of this discussion, the latter definition of families of products is utilized. Note that in design system 1 (FIG. 1), the system can utilize a default definition of families of products (searching for all products that utilize each process) or can group products in other ways based on operator input.

In step 64 (FIG. 4), the tasks for each product i at process j is identified, along with the actual time for completion of each task. Table IX shows a sequence of events for producing product 1 (the 2" gearbox) at process 1 (assembly).

TABLE IX

Sequence of Events for Product 1 at Process 1 (times in minutes)

| Sequence ID | Task | Machine Time | Labor Time | TQC/ verify |
|---|---|---|---|---|
| 10 | Retrieve housing | 0.0 | 0.1 | Check tapped hole for paint; none should be present |

TABLE IX-continued

Sequence of Events for Product 1 at Process 1 (times in minutes)

| Sequence ID | Task | Machine Time | Labor Time | TQC/verify |
|---|---|---|---|---|
| 20 | Place Bottom Seal | 0.0 | 0.1 | Be certain it is seated properly |
| 30 | Grease Housing | 0.0 | 0.5 | In area where worm-shaft will go; fill recess to top of housing |
| 40 | Insert worm-shaft into greased housing | 0.0 | 1.0 | Into greased housing recess |
| 50 | place gear | 0.0 | 0.3 | Over bottom seat; mesh with worm gear |
| 60 | install switch | 0.0 | 2.0 | Secure with 2 screws; wires to exit bottom hole in housing. |
| 70 | place top seal | 0.0 | 0.1 | Over gear; be certain it is seated properly |
| 80 | install cover assembly | 0.0 | 0.3 | Rotate left and right to install; seat properly; pull wires through hoe in cover; secure with 2 screws |
| 90 | dress wires | 0.0 | 0.5 | Separate and single-knot wires for power (white), ground (green), and common (black) |
| 100 | place completed unit in IPK | 0.0 | 0.1 | |

From Table XI, Assembly process 1 for producing product 1 (a 2" gearbox) takes 5 minutes of labor and 0 minutes of machine time. From tables like Table XI, a product/task work map such as that shown in Table XII is produced.

TABLE XI

Product/process map wth sequence-of-event times (M = Machine time; L = Labor time; times are in minutes)

| | Proc. 1 | Proc. 2 | Proc. 3 | Proc. 4 | Proc. 5 | Proc. 6 | Proc. 7 | Proc. 8 |
|---|---|---|---|---|---|---|---|---|
| Prod. 1 | M: 0.0 L: 5.0 | M: 0.0 L: 10.0 | M: 0.0 L: 5.0 | M: 8.2 L: 8.2 | M: 0.0 L: 1.0 | M: 5.0 L: 5.0 | M: 0.0 L: 10.0 | M: 0.0 L: 2.0 |
| Prod. 2 | M: 0.0 L: 6.0 | M: 0.0 L: 10.0 | M: 0.0 L: 5.0 | M: 8.2 L: 8.2 | M: 0.0 L: 1.0 | M: 5.0 L: 5.0 | M: 0.0 L: 10.0 | M: 0.0 L: 2.0 |
| Prod. 3 | M: 0.0 L: 7.0 | M: 0.0 L: 10.0 | M: 0.0 L: 5.0 | M: 8.2 L: 8.2 | M: 0.0 L: 2.0 | M: 5.0 L: 5.0 | M: 0.0 L: 10.0 | M: 0.0 L: 2.0 |
| Prod. 4 | M: 0.0 L: 8.0 | M: 0.0 L: 10.0 | M: 0.0 L: 8.0 | M: 8.2 L: 8.2 | M: 0.0 L: 2.0 | M: 5.0 L: 5.0 | M: 0.0 L: 10.0 | M: 0.0 L: 2.0 |
| Prod. 5 | M: 0.0 L: 9.0 | | | M: 8.2 L: 8.2 | M: 0.0 L: 3.0 | M: 5.0 L: 5.0 | M: 0.0 L: 10.0 | M: 0.0 L: 2.0 |
| Prod. 6 | M: 0.0 L: 10.0 | | | M: 8.2 L: 8.2 | M: 0.0 L: 3.0 | M: 5.0 L: 5.0 | M: 0.0 L: 10.0 | M: 0.0 L: 2.0 |
| Prod. 7 | M: 0.0 L: 50.0 | M: 0.0 L: 12.0 | | | | M: 5.0 L: 6.0 | | M: 0.0 L: 3.0 |
| Prod. 8 | M: 0.0 L: 55.0 | M: 0.0 L: 12.0 | | | | M: 5.0 L: 6.0 | | M: 0.0 L: 3.0 |
| Prod. 9 | M: 0.0 L: 60.0 | M: 0.0 L: 12.0 | | | | M: 5.0 L: 6.0 | | M: 0.0 L: 3.0 |

From the data in Table XI, actual cycle times for each product at each process can be calculated as in steps 74 through 82. Table XII lists the actual cycle times, $At_{ij}$, for each product i at each process j. In Table XII, the overlap times have been deleted as in step 76 of FIG. 4.

TABLE XII

Actual cycle times (in minutes) for each product at each process, $AT_{ij}$

| | Proc. 1 | Proc. 2 | Proc. 3 | Proc. 4 | Proc. 5 | Proc. 6 | Proc. 7 | Proc. 8 |
|---|---|---|---|---|---|---|---|---|
| Prod. 1 | 5.0 | 10.0 | 5.0 | 8.2 | 1.0 | 5.0 | 10.0 | 2.0 |
| Prod. 2 | 6.0 | 10.0 | 5.0 | 8.2 | 1.0 | 5.0 | 10.0 | 2.0 |
| Prod. 3 | 7.0 | 10.0 | 5.0 | 8.2 | 2.0 | 5.0 | 10.0 | 2.0 |
| Prod. 4 | 8.0 | 10.0 | 8.0 | 8.2 | 2.0 | 5.0 | 10.0 | 2.0 |
| Prod. 5 | 9.0 | | | 8.2 | 3.0 | 5.0 | 10.0 | 2.0 |
| Prod. 6 | 10.0 | | | 8.2 | 3.0 | 5.0 | 10.0 | 2.0 |
| Prod. 7 | 50.0 | 12.0 | | | | 6.0 | | 3.0 |

TABLE XII-continued

Actual cycle times (in minutes) for each product at each process, $AT_{ij}$

|  | Proc. 1 | Proc. 2 | Proc. 3 | Proc. 4 | Proc. 5 | Proc. 6 | Proc. 7 | Proc. 8 |
|---|---|---|---|---|---|---|---|---|
| Prod. 8 | 55.0 | 12.0 |  |  |  | 6.0 |  | 3.0 |
| Prod. 9 | 60.0 | 12.0 |  |  |  | 6.0 |  | 3.0 |

In step 83 (FIG. 5), the demand at capacity of each product is defined. The demand at capacity $Dc_j$ is the maximum daily number of units of product that the manufacturing line designed by design system 1 is capable of producing. In the present example, $Dc_j$ is given in Table XIII:

TABLE XIII

EOL Demand at Capacity for each product

| Product ID | $Dc_j$ |
|---|---|
| 1 | 10 |
| 2 | 20 |
| 3 | 30 |
| 4 | 10 |
| 5 | 15 |
| 6 | 5 |
| 7 | 5 |
| 8 | 3 |
| 9 | 2 |

In step 84, the number of hours for each shift is defined. Typically, all recurring lost or unavailable times is subtracted from available time. In the present example, there are 8 hours per shift but 0.7 hours are lost for employee breaks, equipment downtime, maintenance timer, recurring meetings or other similar occurrences. Therefore, each of process 1 through 8 has 7.3 hours per shift. Also, in this example, it is assumed that there is one shift for each process per day. Therefore, $H_j=7.3$ hours and $S_j=1$ for all j.

In step 87 (FIG. 5), the demand at capacity for each product at each process $Dc_{ij}$ is calculated. The demand at capacity for a product at a process depends on the process yield, rework, option and scrap factors. In the present example, there is one rework process, one instance of scrap and no option process. Consider product 1, the 2" gearbox.

Following the procedures that have previously been outlined for calculating $Dc_{ij}$, if we start with x units of product 1 at the beginning of the main path, assembly 1101. There is no scrap or diversion of product into option or rework paths at assembly 1101 and therefore x amount of product leaves assembly 1101. The amount of product that is input to test 1106 is x+z where z is the output of product from rework 1107. At the conclusion of test 1106, 20% of product 1 is diverted to rework 1107. Therefore, the amount of product input to rework 1107 is 0.2(x+z). The output of rework 1107, therefore, is also 0.2(x+z) which is z. Therefore, z=0.25x. None of product 1 is diverted to scrap 1110. The amount of product that is input to pack 1108, therefore, is 0.8(x+z)= 0.8(1.25)x=x. Therefore, the amount of product 1 that is output from pack 1108 to EOL 1109 is x. Normalizing x so that the demand at capacity Dc of product 1 is 10 indicates that x=10.

Because product 1 requires one worm shaft to be produced by worm shaft 1102, then the demand at capacity for product 1 at worm shaft 1102 is also 10. Additionally, feeder path 1111 has no losses or rework paths. As such, the demand at capacity for product 1 at cover assembly 1103, drill and tap 1104 and deburr 1105 is also 10.

Table XIV indicates the demand at capacity for each product at each process. Note that products 7–9 require that worm shaft 1102 produce two worm shafts for each gearbox instead of one and that products 7 through 9 do not utilize rework 1107, directing 5% of products 7–9 to scrap 1110 instead. Therefore, starting with x units at assembly 1101, x units of product are input to test 1106. From test 1106, 5% of product (0.05x) is directed to scrap 1110 while 95% (0.95x) of product is input to pack 1108 to yield 0.95 x at EOL. Therefore, to yield a demand at capacity for product 7 of 5 units, x=5.26 units of product 7.

TABLE XIV

Demand at Capacity for each product at each process $Dc_{ij}$.

|  | Dc EOL 1109 | Proc. 1 Assem. 1101 | Proc. 2 worm shaft 1102 | Proc. 3 cover assem. 1103 | Proc. 4 drill & tap 1104 | Proc. 5 deburr 1105 | Proc. 6 test 1106 | Proc. 7 rework 1107 | Proc. 8 pack 1108 |
|---|---|---|---|---|---|---|---|---|---|
| Prod. 1 (2") | 10 | 10 | 10 | 10 | 10 | 10 | 12 | 2 | 10 |
| Prod. 2 (3") | 20 | 20 | 20 | 20 | 20 | 20 | 24 | 4 | 20 |
| Prod. 3 (4") | 30 | 30 | 30 | 30 | 30 | 30 | 36 | 6 | 30 |
| Prod. 4 (6") | 10 | 10 | 10 | 10 | 10 | 10 | 12 | 2 | 10 |
| Prod. 5 (8") | 15 | 15 |  |  | 15 | 15 | 18.75 | 3.75 | 15 |
| Prod. 6 (12") | 5 | 5 |  |  | 5 | 5 | 6.25 | 1.25 | 5 |
| Prod. 7 (18") | 5 | 5.26 | 10.52 |  |  |  | 5.26 |  | 5 |

TABLE XIV-continued

Demand at Capacity for each product at each process $Dc_{ij}$.

|  | Dc EOL 1109 | Proc. 1 Assem. 1101 | Proc. 2 worm shaft 1102 | Proc. 3 cover assem. 1103 | Proc. 4 drill & tap 1104 | Proc. 5 deburr 1105 | Proc. 6 test 1106 | Proc. 7 rework 1107 | Proc. 8 pack 1108 |
|---|---|---|---|---|---|---|---|---|---|
| Prod. 8 (24") | 3 | 3.16 | 6.32 |  |  |  | 3.16 |  | 3 |
| Prod. 9 (36") | 2 | 2.1 | 4.2 |  |  |  | 2.1 |  | 2 |
| Total $Dc_j$ | 100 | 100.52 | 91.04 | 70 | 90 | 90 | 119.52 | 19 | 100 |

From Table XIV, the operational cycle time (Takt time) $OPc/t_j$ for each process is calculated in step 92 (FIG. 5). As has been previously discussed, $Opc/t_j = (H_j * S_j)/Dc_j$ where in this example $H_j = 7.3$ hours (the number of hours in one shift of process j) and $S_j = 1$ (the number of shifts for process j per day). In that case, Table XV gives the takt times for each of processes 1 through 9.

From Table XI and Table XIV, the actual weighted cycle time $ATw_j$ is calculated in step 93 of FIG. 5. The actual weighted cycle time $ATw_j$ is given by Equation 2. In Table XV, the actual cycle time for each product at each process, segregated into machine time (M) and labor time (L), is given along with the actual weighted cycle time $ATw_j$. For convenience, Table XV also includes the total demand at capacity for each process $Dc_j$.

TABLE XV

Calculation of the takt time for each process and the actual weighted cycle time for each process.

|  | Proc. 1 Assem. 1101 | Proc. 2 Worm Shaft 1102 | Proc. 3 Cover Assem. 1103 | Proc. 4 Drill & Tap 1104 | Proc. 5 Deburr 1105 | Proc. 6 Test 1108 | Proc. 7 Rework 1107 | Proc. 8 Pack 1109 |
|---|---|---|---|---|---|---|---|---|
| Prod. 1 (2") Min | M: 0.0 L: 50.0 | M: 0.0 L: 100.0 | M: 0.0 L: 50.0 | M: 82.0 L: 82.0 | M: 0.0 L: 10.0 | M: 60.0 L: 60.0 | M: 0.0 L: 20.0 | M: 0.0 L: 20.0 |
| Prod. 2 (3") Min | M: 0.0 L: 120.0 | M: 0.0 L: 200.0 | M: 0.0 L: 100.0 | M: 164.0 L: 164.0 | M: 0.0 L: 20.0 | M 120.0 L: 120.0 | M: 0.0 L: 40.0 | M: 0.0 L: 40.0 |
| Prod. 3 (4") Min | M: 0.0 L: 210.0 | M: 0.0 L: 300.0 | M: 0.0 L: 150.0 | M: 246.0 L: 246.0 | M: 0.0 L: 60.0 | M: 180.0 L: 180.0 | M: 0.0 L: 60.0 | M: 0.0 L: 60.0 |
| Prod. 4 (6") Min | M: 0.0 L: 80.0 | M: 0.0 L: 100.0 | M: 0.0 L: 80.0 | M: 82.0 L: 82.0 | M: 0.0 L: 20.0 | M: 60.0 L: 60.0 | M: 0.0 L: 20.0 | M: 0.0 L: 20.0 |
| Prod. 5 (8") Min | M: 0.0 L: 135.0 |  |  | M: 123.0 L: 123.0 | M: 0.0 L: 45.0 | M: 93.75 L: 93.75 | M: 0.0 L: 37.5 | M: 0.0 L: 30.0 |
| Prod. 6 (12") Min | M: 0.0 L: 50.0 |  |  | M: 41.0 L: 41.0 | M: 0.0 L: 15.0 | M: 31.25 L: 31.25 | M: 0.0 L: 12.5 | M: 0.0 L: 10.0 |
| Prod. 7 (18") Min | M: 0.0 L: 263.0 | M: 0.0 L: 126.2 |  |  |  | M: 27.67 L: 31.67 | M: 0.0 L: 0 | M: 0.0 L: 15.0 |
| Prod. 8 (24") Min | M: 0.0 L: 173.8 | M: 0.0 L: 75.84 |  |  |  | M: 15.8 L: 18.96 |  | M: 0.0 L: 9.0 |
| Prod. 9 (36") Min | M: 0.0 L: 126.0 | M: 0.0 L: 50.4 |  |  |  | M: 10.5 L: 12.6 |  | M: 0.0 L: 6.0 |
| Sum i $AT_{ij}$ | M: 0.0 L: 1207.8 | M: 0.0 L: 952.5 | M: 0.0 L: 380.0 | M: 738.0 L: 738.0 | M: 0.0 L: 170.0 | M: 599.0 L: 608.2 | M: 0.0 L: 190.0 | M: 0.0 L: 210.0 |
| Total $Dc_j$ | 100.52 | 91.04 | 70 | 90 | 90 | 119.52 | 19 | 100 |
| ATw | M: 0 L: 12.02 | M: 0.0 L: 10.46 | M: 0.0 L: 5.43 | M: 8.2 L: 8.2 | M: 0.0 L: 1.89 | M: 5.00 L: 5.09 | M: 0.0 L: 10.0 | M: 0.0 L: 2.10 |
| $Opc/t_j$ (Min) | 4.36 | 4.81 | 6.26 | 4.87 | 4.87 | 3.66 | 23.05 | 4.38 |
| $N_j$ | M: 0.0 L: 2.76 | M: 0.0 L: 2.16 | M: 0.0 L: 0.86 | M: 1.68 L: 1.68 | M: 0.0 L: 0.39 | M: 1.4 L: 1.4 | M: 0.0 L: 0.43 | M: 0.0 L: 0.48 |
| OPER. | 0/3 | 0/3 | 0/1 | 2/2 | 0/1 | 2/2 | 0/1 | 0/1 |

From the compilation of Table XV, the number of resources required at each process can be calculated. The number of resources required is given by the ratio between the actual weighted cycle time $ATw_j$ for that process and the takt time for process j, $OPc/t_j$. The number of resources required is calculated according to step 202 (FIG. 6). The number of resources is given by the ratio of the actual weighted cycle time $Atw_j$ for process j and the takt time for process j. This ratio is given in Table XV as $N_j$. Notice that, for these calculations, the labor time and the machine times are calculated separately. The number of operations is also tabulated. The number of operations is the number of machine resources (i.e., the number of machines) and the number of labor resources (i.e., the number of shifts) required to meet the demand at capacity at EOL Dc requirements of the manufacturing line. Note that the number of operations is an integer number, adding only whole shifts or whole machines, and that the number of resources is always greater than the number required. In this example, the value of UTL used in step 203 of FIG. 6 is 1.

In step 301 of FIG. 8A, the operator must decide a method of cell definition. The automatic cell definition, step 322, described here uses time indexing in order to separate processes into cells. Time indexing is a technique that is used to design a mixed model line when significant variation exists in the actual process times various products at particular processes. For example, process 1 (assembly 1101) has a variation in time to produce products of between 5 minutes and 60 minutes. If a 5 minute product is followed by a 60 minute product, an imbalance is created in the flow and downstream processes would become idle.

The operator may also choose other considerations for forming cells. The original demand at capacity for each product should be considered as well as presentation of material to the line, physical constraints, and general knowledge of the processes involved. If the products that cause variation are low in volume, the operator may choose to produce those products in a separate cell. If products do not share common material, cells may be separated to facilitate material delivery to the manufacturing line. Formation of cells may also be influenced by building requirements, safety requirements, and other factors that are determined by the operator. Following the automatic definition of cells, step 322, shown in FIG. 8D, it is clear from Table XV that products 1 through 6 at process 1 can be grouped in one cell and that products 7–9 at process 1 can be grouped in a third. Each of processes 2 through 9 for all products are grouped into separate cells as well. To see that this is true, the takt time for process 1 is 4.36 minutes. For products 1 through 6, the time index given by the ratio of the actual time to the takt time ranges from 1.1 to 2.3 whereas the time index for products 7–9 ranges from 11.6 to 14.0. Table XVI shows the refinement of the balance resources step with the new cell definitions.

TABLE XVI

|  | Cell 1<br>Proc. 1<br>assem.<br>1101 | Cell 2<br>Proc. 1<br>Assem.<br>1101 | Cell 3<br>Proc. 2<br>worm<br>shaft<br>1102 | Cell 4<br>Proc. 3<br>cover<br>assem.<br>1103 | Cell 5<br>Proc. 4<br>drill &<br>tap<br>1104 | Cell 6<br>Proc. 5<br>deburr<br>1105 | Cell 7<br>Proc. 6<br>test<br>1106 | Cell 8<br>Proc. 7<br>rework<br>1107 | Cell 9<br>Proc. 8<br>pack<br>1108 |
|---|---|---|---|---|---|---|---|---|---|
| Prod. 1 | M: 0.0<br>L: 5.0<br>(10) | | M: 0.0<br>L: 10.0<br>(10) | M: 0.0<br>L: 5.0<br>(10) | M: 8.2<br>L: 8.2<br>(10) | M: 0.0<br>L: 1.0<br>(10) | M: 5.0<br>L: 5.0<br>(12) | M: 0.0<br>L: 10.0<br>(2) | M: 0.0<br>L: 2.0<br>(10) |
| Prod. 2 | M: 0.0<br>L: 6.0<br>(20) | | M: 0.0<br>L: 10.0<br>(20) | M: 0.0<br>L: 5.0<br>(20) | M: 8.2<br>L: 8.2<br>(20) | M: 0.0<br>L: 1.0<br>(20) | M: 5.0<br>L: 5.0<br>(24) | M: 0.0<br>L: 10.0<br>(4) | M: 0.0<br>L: 2.0<br>(20) |
| Prod. 3 | M: 0.0:<br>L: 7.0<br>(30) | | M: 0.0<br>L: 10.0<br>(30) | M: 0.0<br>L: 5.0<br>(30) | M: 8.2<br>L: 8.2<br>(30) | M: 0.0<br>L: 2.0<br>(30) | M: 5.0<br>L: 5.0<br>(36) | M: 0.0<br>L: 10.0<br>(6) | M: 0.0<br>L: 2.0<br>(30) |
| Prod. 4 | M: 0.0:<br>L: 8.0<br>(10) | | M: 0.0<br>L: 10.0<br>(10) | M: 0.0<br>L: 8.0<br>(10) | M: 8.2<br>L: 8.2<br>(10) | M: 0.0<br>L: 2.0<br>(10) | M: 5.0<br>L: 5.0<br>(12) | M: 0.0<br>L: 10.0<br>(2) | M: 0.0<br>L: 2.0<br>(10) |
| Prod. 5 | M: 0.0:<br>L: 9.0<br>(15) | | | | M: 8.2<br>L: 8.2<br>(15) | M: 0.0<br>L: 3.0<br>(15) | M: 5.0<br>L: 5.0<br>(18.75) | M: 0.0<br>L: 10.0<br>(3.75) | M: 0.0<br>L: 2.0<br>(15) |
| Prod. 6 | M: 0.0:<br>L: 10.0<br>(5) | | | | M: 8.2<br>L: 8.2<br>(5) | M: 0.0<br>L: 3.0<br>(5) | M: 5.0<br>L: 5.0<br>(6.25) | M: 0.0<br>L: 10.0<br>(1.25) | M: 0.0<br>L: 2.0<br>(5) |
| Prod. 7 | | M: 0.0<br>L: 50.0<br>(5.26) | M: 0.0<br>L: 12.0<br>(10.52) | | | | M: 5.0<br>L: 6.0<br>(5.26) | | M: 0.0<br>L: 3.0<br>(5) |
| Prod. 8 | | M: 0.0<br>L: 55.0<br>(3.16) | M: 0.0<br>L: 12.0<br>(6.32) | | | | M: 5.0<br>L: 6.0<br>(3.16) | | M: 0.0<br>L: 3.0<br>(3) |
| Prod. 9 | | M: 0.0<br>L: 60.0<br>(2.1) | M: 0.0<br>L: 12.0<br>(4.2) | | | | M: 5.0<br>L: 6.0<br>(2.1) | | M: 0.0<br>L: 3.0<br>(2) |
| Total Dc | 90 | 10.52 | 91.04 | 70.0 | 90.0 | 90.0 | 119.52 | 19 | 100 |
| Takt time | 4.87 | 41.63 | 4.81 | 6.26 | 4.87 | 4.87 | 3.67 | 23.05 | 4.38 |
| ATs | M: 0.0<br>L: 7.17 | M: 0.0<br>L: 53.5 | M: 0.0<br>L: 10.5 | M: 0.0<br>L: 5.43 | M: 8.2<br>L: 8.2 | M: 0.0<br>L: 1.9 | M: 5.0<br>L: 5.1 | M: 0.0<br>L: 10.0 | M: 0.0<br>L: 0.5 |
| N | M: 0.0<br>L: 1.5 | M: 0.0<br>L: 1.3 | M: 0.0<br>L: 2.2 | M: 0.0<br>L: 0.9 | M: 1.7<br>L: 1.7 | M: 0.0<br>L: 0.4 | M: 1.4<br>L: 1.4 | M: 0.0<br>L: 0.4 | M: 0.0<br>L: 0.5 |
| Res. | 0/2 | 0/2 | 0/3 | 0/1 | 2/2 | 0/4 | 2/2 | 0/1 | 0/1 |

In operational balance 400, steps 401 through 415 of FIG. 9, operations within each cell are defined according to the takt time for the cell. Referring to cells 1 and 2 and the sequence of events shown in Table IX, cells 1 and 2 can be divided into two operations. Operation 1 includes tasks 10 through 50 and operation 2 includes tasks 60–100.

In operations balancing 450, indexing may be applied to each operation within the cell. Additionally, imbalances in timing are recognized and non-value added work is eliminated, work is reallocated, additional resources are assigned, or other actions are taken in order to balance the flow of product through each cell.

The above-described examples of this invention are demonstrative only. Those skilled in the art will recognize a plethora of variations based on these examples, all of which are intended to be included within the scope of this description. As such, the invention is limited only by the following claims.

I claim:

1. A method for computerized design of a demand-flow mixed-model manufacturing line, comprising:

defining a plurality of products in terms of a set of processes that results in manufacture of the plurality of products, the set of processes being a subset of the set of all processes included in the demand-flow mixed-model manufacturing line;

balancing process resources for each process of the set of all processes so that, for each process, an actual process time is approximately an operational cycle time, the operational cycle time being the maximum amount of time that a process can use to produce a unit of the plurality of products; and outputting the computerized design reflecting the balanced resources.

2. The method of claim 1, further including defining each process in the set of process in terms of process parameters.

3. The method of claim 2, further including synchronizing the plurality of products.

4. A method for computerized design of a demand-flow mixed-model manufacturing line, comprising:

defining at least one product in terms of a set of processes that results in manufacture of the at least one product, the set of processes being a subset of the set of all processes included in the demand-flow mixed-model manufacturing line;

balancing process resources for each process of the set of all processes so that, for each process, an actual process time is approximately an operational cycle time;

defining each process in the set of process in terms of process parameters, wherein the process parameters include a sequence of events, a work content for each task in the sequence of events, and a yield and synchronizing the at least one product includes:

identifying a family of products for each process in the set of all processes, the family of products including each of the at least one product that includes the process in the set of processes for the at least one product;

defining a product demand-at-capacity for each of the at least one product, the product demand-at-capacity being the overall demand for the product;

defining the amount of time available for each process in the set of all processes;

calculating the process demand-at-capacity for each process in the set of all processes based on the product demand-at-capacity and the yield for that process;

calculating the actual process time from the work content for each task in the sequence of events and the process demand-at-capacity;

calculating an operational cycle time for each process in the set of all processes from the amount of time available; and outputting the computerized design reflecting the balanced resources.

5. The method of claim 4, wherein balancing process resources comprises:

calculating a resource multiplier for each process in the set of all processes, the resource multiplier being the actual process time for that process divided by the operational cycle time for that process;

determining a total number of resources required to reach the product demand-at-capacity for all of the at least one product by multiplying the a currently available number of resources upon which the process parameters are based by the resource multiplier.

6. The method of claim 4, further comprising:

identifying at least one cell, each of the at least one cell comprising at least one process of the set of all processes;

identifying operations within each of the at least one cell;

balancing operations within each of the at least one cell so that, for each operation, an actual process time is approximately an operational cycle time.

7. The method of claim 6, wherein the at least one cell is defined manually by an operator.

8. The method of claim 6, wherein the at least one cell is defined by defining each of the at least one cell to be a process of the set of all processes.

9. The method of claim 6, wherein the at least one cell is defined under a cell definition criteria.

10. The Method of claim 9, wherein the cell definition criteria comprises balancing products so that, at each process in the set of all processes, each of the at least one product in the family of products utilize approximately the same time.

11. The method of claim 10, wherein, for each process in the set of all processes, balancing products comprises:

calculating a time index for each product;

removing the product from the family of products and placing it in an alternate family of products if the time index falls outside of an acceptable range;

defining additional option paths based on the alternate family of products.

12. The method of claim 6, wherein an operator chooses a method of cell definition for defining the at least one cell from choices including a manual definition, a definition using a constant volume criteria, or a definition equating each of the at least one cell with a process of the set of all processes.

13. The method of claim 6, wherein identifying operations within each of the at least one cell comprises:

defining an operation cycle time;

assigning tasks from the sequence of events for the processes in the at least one cell until a summed work content time exceeds the operation cycle time, the summed work content time is the sum of the work content time for each task added to the operation of the at least one cell.

14. The method of claim 13, wherein balancing operations for each of the at least one cell comprises defining an upper cycle index limit;

calculating an operational time index for each operation in the at least one cell, the operation time index being the summed work content over the operation cycle time;

adjusting tasks of the operation until the operation time index is less than the upper cycle index limit.

15. A system for designing a demand-flow mixed-model manufacturing line, comprising:
- a storage memory for holding computer programs and data;
- a main memory for temporary storage of computer programs and data;
- at least one data input device;
- at least one display device;
- a processor interacting with the storage memory, the main memory, the at least one data input device, and the at least one display device, the processor executing computer programs;
- a computer program executable by the processor, the computer program including
  - computer code directing definition of a plurality of products in terms of a set of processes that result in manufacture of the plurality of products, the set of processes being a subset of the set of all processes included in the demand-flow mixed-model manufacturing line, each process in the set of processes being defined in terns of process parameters, and
  - computer code balancing process resources for each process of the set of all processes so that, for each process. an actual process time is approximately an operational cycle time, the operational cycle time being the maximum amount of time that a process can use to produce a unit of the plurality of products.

16. The system of claim 15, wherein the computer program further includes computer code for synchronizing the plurality of products.

17. A system for designing a demand-flow mixed-model manufacturing line, comprising:
- a storage memory for holding computer programs and data;
- a main memory for temporary storage of computer programs and data;
- at least one data input device;
- at least one display device;
- a processor interacting with the storage memory, the main memory, the at least one data input device, and the at least one display device, the processor executing computer programs;
- a computer program executable by the processor, the computer program including
  - computer code directing definition of at least one product in terms of a set of processes that result in manufacture of the at least one product, the set of processes being a subset of the set of all processes included in the demand-flow mixed-model manufacturing line, each process in the set of processes being defined in terms of process parameters,
  - computer code balancing process resources for each process of the set of all processes, and
  - computer code synchronizing the at least one product
  - computer code for identifying at least one cell, each of the at least one cell comprising at least one process of the set of all processes,
  - computer code for identifying operations within each of the at least one cell, and
  - computer code for balancing operations within each of the at least one cell so that, for each operation, an actual process time is approximately an operational cycle time.

18. The system of claim 17, wherein the computer program further includes computer code for balancing products.

* * * * *